United States Patent
Marfatia et al.

(10) Patent No.: US 7,917,457 B2
(45) Date of Patent: *Mar. 29, 2011

(54) KNOWLEDGE EXTRACTION AND ABSTRACTION

(75) Inventors: Miten Marfatia, Sunnyvale, CA (US); Ajay M. Rambhia, Santa Clara, CA (US)

(73) Assignee: EvolveWare, Inc., Santa Clara, CA (US)

( * ) Notice: Subject to any disclaimer, the term of this patent is extended or adjusted under 35 U.S.C. 154(b) by 765 days.

This patent is subject to a terminal disclaimer.

(21) Appl. No.: 11/684,581

(22) Filed: Mar. 9, 2007

(65) Prior Publication Data
US 2007/0214100 A1  Sep. 13, 2007

Related U.S. Application Data

(60) Provisional application No. 60/781,214, filed on Mar. 9, 2006, provisional application No. 60/797,522, filed on May 3, 2006.

(51) Int. Cl.
*G06F 17/00* (2006.01)
*G06N 5/00* (2006.01)
(52) U.S. Cl. .......................................... 706/45
(58) Field of Classification Search ............... 706/45
See application file for complete search history.

(56) References Cited

U.S. PATENT DOCUMENTS

| | | | |
|---|---|---|---|
| 5,497,319 | A | 3/1996 | Chong et al. |
| 5,678,044 | A | 10/1997 | Pastilha et al. |
| 6,257,774 | B1 | 7/2001 | Stack |
| 2003/0217023 | A1* | 11/2003 | Cui et al. .................. 706/45 |
| 2005/0038770 | A1 | 2/2005 | Kuchinsky et al. |

OTHER PUBLICATIONS

Ferenc, Rudolf, Arpad Beszedes and Tibor Gyimothy. In Tool Demonstrations of the 8th European Conference on Software Maintenance and Reengineering (CSMR 2004.*
Tjortjis, Christos Loukas Sinos and Paul Layzell. "Facilitating Program Comprehension by Mining Association Rules from Source Code" Proceedings of the 11th IEEE Interntational Workshop On Program Comprehension 2003.*
PCT International Search Report and Written Opinion, PCT/US07/06249, Mar. 6, 2008, 12 Pages.
"A Complete End-to-End Solution for Database and Application Migration with CA Tools and EvolveWare's Patent-Pending S2T Technology," EvolveWare, Inc., 2003, 7 pages.
"A Technical Overview: Modernize Your Enterprise with Automated Software Transformation Technology, Any Source 2 Any Target," EvolveWare, Inc., 2006, 20 pages.

(Continued)

*Primary Examiner* — Donald Sparks
*Assistant Examiner* — Ben M Rifkin
(74) *Attorney, Agent, or Firm* — Fenwick & West LLP

(57) ABSTRACT

The present disclosure includes a system and method for learning (or discovering and extracting) business knowledge from a collection of source code. The collection of source code is abstracted to generate an abstracted data stream, which is then transformed to an Extensible Markup Language (XML) format. The transformed data in XML format can be further converted to target formats or processed to satisfy different needs such as software system documentation, migration, impact analysis and security analysis. The disclosure also includes an implementation and operation for a pattern abstraction engine configured to receive an input data stream and format it for abstraction into a standard format using a pattern matching mechanism. The disclosure also includes an implementation and operation for a contextual pattern decoder engine configured to extract knowledge attributes and contextual taxonomy from classified blocks of an input data stream.

27 Claims, 23 Drawing Sheets

OTHER PUBLICATIONS

"About EvolveWare, Inc.," EvolveWare, 2002, www.evolveware.com, 1 page.
"Adabas/Natural-2-Gen Tool—Frequently Asked Questions," EvolveWare, Inc., 2006, 6 pages.
"Advantage-2-SQL Server Proposed Automation Guideline,"EvolveWare, Inc. and Computer Associates International, Inc., Mar. 19, 2004, 7 pages.
"AllFusion® Gen Legacy Renewal Technical Overview," Computer Associates International, Inc., 2004, pp. 1-40.
"An Introduction: Modernize Your Enterprise with Automated Software Transformation Technology, Any Source 2 Any Target," EvolveWare, Inc., PowerPoint Presentation, 2006, 14 pages.
"Any Source-2-Any Target," EvolveWare, Inc., PowerPoint Presentation, 2005, 18 pages.
"Applying S2T™ Technology Best Practices," EvolveWare, Inc., Feb. 2, 2003, Document Ref: BP/S2T/EW/V1.2.1/02012003, 2003, pp. 1-13.
"Automated Conversion of Legacy Applications to AllFusion Gen/Plex/Joe Models," Computer Associates International, Inc., PowerPoint Presentation, 2004, 13 pages.
"Automated Transformation Technology—Any Source 2 Any Target," EvolveWare, Inc., 2004, 20 pages.
Bravo, R., et al., "Automated Conversion of Legacy Applications to Advantage Gen/Plex/Joe Models," Computer Associates International, Inc., PowerPoint Presentation, 2004, 21 pages.
Bravo, R., et al., "Automated Migration of Legacy Systems," EvolveWare, Inc., PowerPoint Presentation, 2003, 9 pages.
Bravo, R., et al., "Computer Associates, EvolveWare, Inc.: A Partnership—Exploring Opportunities," EvolveWare, Inc., PowerPoint Presentation, 2003, 19 pages.
Bravo, R., Presentation Notes, LA, 2003, 17 pages.
Bravo, R., "R2T Technology—A Presentation," EvolveWare, Inc., PowerPoint Presentation, 2002, 8 pages.
Bravo, R., "S2T Technology: A Preview—Automated Migration & Conversion Technology," EvolveWare, Inc., PowerPoint Presentation, 2003, 9 pages.
Bravo, R., et al., "S2T™ Technology: Automated Migration & Conversion Technology," EvolveWare, Inc., PowerPoint Presentation, 2003, 13 pages.
"Business Logic Extraction, Database Discovery & Application Mining Tool," EvolveWare, Inc., Acceptance Criteria, Jan. 28, 2004, 5 pages.
"Capabilities Provided by EvolveWare for Extending ObjectStar Using Java," EvolveWare, Inc., White Paper, Ref. AM/EW/07052002, 2002, pp. 1-4.
"CA's Legacy Renewal Solution Automates Modernization of Legacy Cobol Applications to New Platforms and Architectures," Computer Associates International, Inc., 2004, 2 pages.
"Client Success Story," EvolveWare, Inc., 2006, 2 pages.
"COBOL-2-Gen Tool—Frequently Asked Questions," EvolveWare, Inc., 2006, 5 pages.
"Comparative ROI—ObjectStar Migration," EvolveWare, Inc., 2002, 1 page.
"Comparison Chart, IBM DB2 UDB Migration ™ Toolkit v/s EvolveWare's S2T™ Technology," EvolveWare, Inc., Jan. 15, 2003, 2 pages.
"Competitive Analysis—20, Migration of Cobol Systems to AllFusion Gen Models," EvolveWare, Inc., 2004, pp. 1-2.
"Competitive Analysis—50, Migration of Cobol Systems to AllFusion Gen Models," EvolveWare, Inc., 2004, pp. 1-2.
Competitive Analysis—100, Migration of Cobol Systems to Open Source Platform, EvolveWare, Inc., 2004, 2 pages.
"Competitive Analysis—150, Migration of Cobol Systems to AllFusion Gen Models," EvolveWare, Inc., 2004, pp. 1-2.
"Competitive Analysis—200, Migration of Cobol Systems to AllFusion Gen Models," EvolveWare, Inc., 2004, pp. 1-2.
"Comprehensive Database Migration Solutions," EvolveWare, Inc., R2J Technology + All Fusion Products, PowerPoint Presentation, V2, 2002, 14 pages.
"Comprehensive Database Migration Solutions," EvolveWare, Inc., R2J Technology + All Fusion Products, PowerPoint Presentation, V3, 2002, 14 pages.
"ComputerAssociates Solution," EvolveWare, Inc., Flow Chart, 2003, 1 page.
"Cost & ROI Analysis, Migration of Adabas/Natural Systems to AllFusion Gen Models—Up to 200 Programs," EvolveWare, Inc., 2004, 15 pages.
"Cost & ROI Analysis, Migration of Cobol Systems to AllFusion Gen Models—Up to 20 Programs," EvolveWare, Inc., 2004, pp. 1-3.
"Cost & ROI Analysis, Migration of Cobol Systems to AllFusion Gen Models—Up to 50 Programs," EvolveWare, Inc., 2004, pp. 1-3.
"Cost & ROI Analysis, Migration of Cobol Systems to AllFusion Gen Models—Up to 100 Programs," EvolveWare, Inc., 2004, pp. 1-3.
"Cost & ROI Analysis, Migration of Cobol Systems to AllFusion Gen Models—Up to 150 Programs," EvolveWare, Inc., 2004, pp. 1-3.
"Cost & ROI Analysis, Migration of Cobol Systems to AllFusion Gen Models—Up to 200 Programs," EvolveWare, Inc., 2004, pp. 1-3.
"Cost & ROI Analysis, Migration of Adabas/Natural Systems to CA's AllFusion Gen Models," EvolveWare, Inc., 2006, 3 pages.
"Cost & ROI Analysis, Migration of Cobol Systems to CA's AllFusion Gen Models," EvolveWare, Inc., 2004, 3 pages.
"Cost Analysis, Adabas/Natural Documentation Tool—Business Logic & Data Discovery of Adabas/Natural Systems," EvolveWare, Inc., 2006 1 page.
"Current Process Flow," Legacy Rejuvenator Process Flow, EvolveWare, Inc., 2004, 3 pages.
"DB2 Case Study," EvolveWare, Inc., 2002, 9 pages.
"Description of S2T™ Technology," EvolveWare, Inc., Feb. 9, 2004, pp. 1-4.
Email Template, R2J Technology, EvolveWare, Inc., 2002, 2 pages.
"Enhancing ObjectStar with EvolveWare APIs & Adapters," EvolveWare, Inc., 2003, 12 pages.
"ERwin Solutions with EvolveWare's S2T Technology," EvolveWare, Inc., PowerPoint Slide, 2003, 1 page.
"EvolveWare, Inc. and ObjectStar Automate Legacy Application Extension," ObjectStar Business International, Inc., 2002, 2 pages.
"EvolveWare's S2T™ Technology—Application Domains, Automated Software Documentation & Transformation Technology—Any Source-2-Any Target," EvolveWare, Inc., May 25, 2006, pp. 1-2.
"EvolveWare's S2T™ Technology, Automated Migration and Conversion Technology—Any Source-2-Any Target," EvolveWare, Inc., PowerPoint Presentation, 2003, 9 pages.
"EvolveWare's S2T™ Technology, S2T™ Technology Goals," R2J Fact Sheet, EvolveWare, Inc., 2002, 1 page.
"EvolveWare's S2T to Gen Best Practices," EvolveWare, Inc., 2004, 5 pages.
"EvolveWare's S2T Tools Market Differentiators, End-2-End Automation Products for Software Analysis, Documentation & Transformation—Any Source-2-Any Target," EvolveWare, Inc., Sep. 29, 2006, pp. 1.
"EvolveWare's Tool Suite for Extending ObjectStar® Applications," EvolveWare API & Adapters Product Sheet, EvolveWare, Inc., 2003, 1 page.
"General ObjectStar Questionnaire," EvolveWare, Inc., 2002, 1 page.
"GUI Summary Report—Inconsistencies," EvolveWare, Inc., spreadsheet, 2004, 2 pages.
"Legacy Application Modernization," Computer Associates International, Inc., PowerPoint Presentation, 2005, 19 pages.
"Legacy Rejuvenator™ Adabas/Natural-2-AllFusion® Gen Tool," EvolveWare, Inc., Product Description, 2006, 2 pages.
"Legacy Rejuvenator™ Cobol-2-AllFusion® Gen (C2G) Tool," EvolveWare, Inc., Product Description, 2004, 2 pages.
"Legacy Rejuvenator™ Cobol-2-AllFusion® Gen (C2G) Tool," EvolveWare, Inc., Product Description, 2006, 2 pages.
"Legacy Rejuvenator™ Cobol-2-AllFusion® Gen Tool," EvolveWare, Inc., Product Description, 2006, 2 pages.
"Legacy Rejuvenator™ Cobol-2-AllFusion® Gen (C2G) User Manual, Ver 1.0.0.10," EvolveWare, Inc., User Manual, Dec. 21, 2004, pp. 1-103.
"Legacy Rejuvenator™ Cobol Business & Data Discovery (CBDD)," EvolveWare, Inc., Revision No. 3, Dec. 14, 2004, pp. 1-93.

"Legacy Rejuvenator™ Cobol Business & Data Discovery (CBDD)," EvolveWare, Inc., Revision No. 3, Dec. 14, 2004, pp. 1-94.
"Legacy Rejuvenator™ Cobol Business & Data Discovery Tool," EvolveWare, Inc., Product Description, 2006, 2 pages.
"Legacy Rejuvenator™ Cobol Impact Analysis Tool," EvolveWare, Inc., Product Description, 2002-2012, 3 pages.
"Legacy Rejuvenator™—Competition," EvolveWare, Inc., 2004, 1 page.
"Legacy Rejuvenator™—Maintenance Console," EvolveWare, Inc., Aug. 2004, Revision No. 1: Dec. 21, 2004, pp. 1-55.
"Legacy Renewal—Business Overview," Computer Associates International, Inc., 2004, 2 pages.
"Legacy Renewal Initiative, Frequently Asked Questions," EvolveWare, Inc. 2004, 6 pages.
"Legacy Renewal Initiative, Frequently Asked Questions," EvolveWare, Inc. 2006, 5 pages.
"Legacy Renewal Technical Overview, Modernization of Legacy Applications," Computer Associates International, Inc., 2004, pp. 1-16.
"Legacy Renewal Technical Overview, Modernization of Legacy Applications," Computer Associates International, Inc., 2004, pp. 1-26.
"Meta-Data Discovery & Mining Proposed Guideline," EvolveWare, Inc., Mar. 12, 2004, 6 pages.
"Migrating Legacy Applications," EvolveWare, Inc., PowerPoint Presentation, 2004, 23 pages.
"Migration Process—Cobol/CICS to Java/Oracle," EvolveWare, Inc., Process documentation—S2T Technology Process, Mar. 28, 2003, pp. 1-8.
"Modeling Legacy & Proprietary Databases Using ERwin," Computer Associates International, Inc., PowerPoint Presentation, 2004, 10 pages.
"Modeling Legacy & Proprietary Databases Using ERwin," Computer Associates International, Inc., PowerPoint Presentation, 2004, 18 pages.
"Multiple User Installation & Screen Shots of 'View' Options Available in the Cobol Business Discovery Tool (CBDT)* ," EvolveWare, Inc., Mar. 8, 2004, 12 pages.
"Ontology Solution Details," EvolveWare, Inc., 2004, 5 pages.
"Overview, ObjectStar to Java Conversion Wizard," EvolveWare, Inc., 2002, 7 pages.
"Preliminary Analysis and Process Strategy to Migrate C++ to J2EE Using Legacy Rejuvenator™," EvolveWare, Inc., Jun. 5, 2004, pp. 1-4.
"Proposed Strategy for Current O* Wizard," EvolveWare, Inc., 2002, 37 pages.
"Questionnaire," EvolveWare, Inc., 2002, 2 pages.
"Questionnaire for S2T™ Technology Based Source Code Migration," EvolveWare, Inc., 2003, pp. 1-2.
"R2J™ Case Study: Alstom Marine," EvolveWare, Inc., 2000, 3 pages.
"R2J Technology," EvolveWare, Inc., 2002, 1 page.
"R2J Technology Update," EvolveWare, Inc., May 15, 2002, 7 pages.
"R2J, Web Services/XML," EvolveWare, Inc., CD Image, 2002, 1 page.
Rambhia, A. M., "Applying R2J™ for Effective Migration and Enhancement of Mainframe Applications Using Viaserve Middleware," EvolveWare, Inc., White Paper, Oct. 2002, pp. 1-9.
Rambhia, A. M., "Applying R2J for Effective Migration of Oracle® to Microsoft® SQL Server Database," EvolveWare, Inc., White Paper, Oct. 2002, 9 pages.
Rambhia, A. M., "EvolveWare's S2T® Technology—A Detailed Overview, Automated Software Analysis, Documentation & Transformatiojn—Any Source-2-Any Target," EvolveWare, Inc., Nov. 21, 2006, pp. 1-7.
Rambhia, A. M., "EvolveWare's S2T® Technology—An Overview, Automated Software Documentation & Transformation Technology—Any Source-2-Any Target," EvolveWare, Inc., May 24, 2006, pp. 1-7.
Rambhia, A. M., "EvolveWare's S2T® Technology—QA Methodology, Automated Software Documentation & Transformation Technology—Any Source-2-Any Target," EvolveWare, Inc., Sep. 8, 2006, 4 pages.
Rambhia, A., "Fremont Employers Insurance, Migration from OS 390 to Solaris," EvolveWare, Inc., PowerPoint presentation, 2002, 10 pages.
Rambhia, A. M., "Patterns in Web Services-Based System Design," EvolveWare, Inc., PowerPoint Presentation, 2002, 15 pages.
Rambhia, A., "Process to Develop an Automated Conversion Tool Using EvolveWare's S2T™ Technology," EvolveWare, Inc., Version 1.0.0/MS/S2T, Jan. 12, 2006, 5 pages.
Rambhia, A. M., "R2J Technology—A Presentation," EvolveWare, Inc., PowerPoint Presentation, 2002, 8 pages.
Rambhia, A. M., "R2J Technology, Brief Overview, White Paper," EvolveWare, Inc., 2006, pp. 1-6.
Rambhia, A. M., "S2T Technology—Automated Migration & Conversion Technology—Process Flow," EvolveWare, Inc., 2003, 9 pages.
"Return on Investment—100, Migration of Cobol Systems to AllFusion Gen Models," EvolveWare, Inc., 2004, 2 pages.
"S2T," EvolveWare, Inc., S2T Logo, 2003, 1 page.
"S2T Automation Tool Structure," EvolveWare, Inc., Flowchart, 2006, 1 page.
"S2T® Automation Tools—Legacy Rejuvenator® User Guide," EvolveWare, Inc., Apr. 9, 2007, 23 pages.
"S2T & CA Data Warehouse," EvolveWare, Inc., PowerPoint Slides, 2003, 4 pages.
"S2T™ Case Study: Great-West Life & Annuity Insurance Company—ObjectStar Database Migration Tool," EvolveWare, Inc., Oct. 2002, 2 pages.
"S2T™—Case Study: ObjectStar-BizTalk Collaboration Tool," EvolveWare, Inc., Nov. 2002, 2 pages.
"S2T™—Case Study: Starwood Hotels," EvolveWare, Inc., Jun. 2000, 4 pages.
"S2T™—Case Study: Thailand SSO Legacy Migration Tool," EvolveWare, Inc., Jul. 2002, 2 pages.
"S2T Cobol-2-Advantage™ Gen," EvolveWare, Inc. and Computer Associates International, Inc., 2004, PowerPoint Presentation, 9 pages.
"S2T Cobol-2-AllFusion® Gen Business & Data Discovery Option," EvolveWare, Inc. and Computer Associates International, Inc., 2004, PowerPoint Presentation, 14 pages.
"S2T™—Cobol-2-Gen ™ Automation Tool," EvolveWare, Inc. & Computer Associates, 2003, 2 pages.
"S2T™—Cobol-2-Gen ™ Suggested Sales Process," EvolveWare, Inc. and Computer Associates, 2003, 2 pages.
"S2T™ Customization Program," EvolveWare, Inc., PowerPoint Presentation, 2004, 8 pages.
"S2T® Documentation Tools, Adabas/Natural Documentation Tool," EvolveWare, Inc., Product Data Sheet, 2002-2012, 6 pages.
"S2T® Documentation Tools, COBOL Documentation Tool," EvolveWare, Inc., Product Data Sheet, 2002-2012, 6 pages.
"S2T Knowledge Engine (KE)," EvolveWare, Inc., flowchart, 1 page.
"S2T® Legacy Documentation Tools, Adabas/Natural Assembler COBOL," EvolveWare, Inc., Product Data Sheet, 2002-2012, 6 pages.
"S2T® Legacy Migration Tools, Adabas/Natural Assembler COBOL," EvolveWare, Inc., Product Data Sheet, 2002-2012, 8 pages.
"S2T Legacy Rejuvenator," EvolveWare, Inc., 2004 CD Cover, v.1. 0.1/CR, 1 page.
Office Action for U.S. Appl. No. 11/684,579, filed Sep. 9, 2009, 12 Pages.
Office Action for U.S. Appl. No. 11/684,580, filed Sep. 8, 2009, 12 Pages.
"S2T Migrating Legacy Applications," EvolveWare, Inc. and Computer Associates International, Inc., 2004, PowerPoint Presentation, 19 pages.
"S2T® Migration Tools, Adabas/Natural Migration Tool," EvolveWare, Inc., Product Data Sheet, 2002-2012, 8 pages.
"S2T® Migration Tools, COBOL Migration Tools," EvolveWare, Inc., Product Data Sheet, 2002-2012, 8 pages.
"S2T™ Questionnaire," EvolveWare, Inc., 2004, 1 page.
"S2T Resource Center," EvolveWare, Inc., flowchart, 2003, 1 page.
"S2T Resource Center COBOL/CICS/BMS 2 J2EE Conversion," EvolveWare's S2T Resource Center, Apr. 22, 2003, 3 pages.

"S2T Resource Center, COBOL/CICS/BMS Conversion, Target System Architecture," EvolveWare, Inc., Apr. 29, 2003, 5 pages.
"S2T Source Code," EvolveWare, Inc., flowchart, 2003, 1 page.
"S2T Source System," EvolveWare, Inc., flowchart, 2003, 1 page.
"S2T ™ Technology—An Introduction, Automated Migration Technology—Any Source 2 Any Target," EvolveWare, Inc., 2004, 9 pages
"S2T ™ Technology Assessment Questionnaire Source 2 Target Migration," EvolveWare, Inc., 2003, pp. 1-3.
"S2T ™ Technology Assessment Questionnaire Source 2 Target Migration," EvolveWare, Inc., Version: 1.6.0, Apr. 5, 2004, pp. 1-3.
"S2T Technology—Process Flow," EvolveWare, Inc., Flowchart, 2003, 1 page.
"SEEC Mosaic Studio Capabilities and Deliverables," EvolveWare, Inc., Aug. 2004 PowerPoint Presentation, pp. 1-64.
"Software Solutions for a Dynamic World," EvolveWare, Inc., Fremont Insurance PowerPoint Presentation, 2002, 12 pages.
"Software Solutions for a Dynamic World," EvolveWare, Inc., Fujitsu PowerPoint Presentation, 2002, 8 pages.
Status Summarization, EvolveWare, Inc., Aug. 16, 2004, 3 pages.
"Technical Reference Guide—S-2-Advantage Joe," EvolveWare, Inc., Jul. 28, 2003, 15 pages.
"Technical Reference Guide—S-2-OPS / MVS," EvolveWare, Inc., Jul. 28, 2003, 9 pages.
"The AllFusionModeling Suite Seminar Series," EvolveWare, Inc. and Computer Associates Seminar Advertisement, 2002, 1 page.
"Validation Form to the ca smart Program Participation Agreement," EvolveWare, Inc., Jul. 28, 2003, 7 pages.
Viewlet Screen Shots 1, EvolveWare, Inc., 6 pages.
Viewlet Screen Shots 2, EvolveWare, Inc., 10 pages.
Viewlet Screen Shots 3, EvolveWare, Inc., 8 pages.
Viewlet Screen Shots 4, EvolveWare, Inc., 11 pages.
Viewlet Screen Shots 5, EvolveWare, Inc., 12 pages.
Viewlet Screen Shots 6, EvolveWare, Inc., 10 pages.
Viewlet Screen Shots 7, EvolveWare, Inc., 11 pages.
Viewlet Screen Shots 8, EvolveWare, Inc., 9 pages.
"Web Services, E-Business Portals, ERP/CRM/SCM Integration, Database Migratior, Financial Modeling," EvolveWare, Inc., Brochure, 2006, 2 pages.
"Web Services, E-Business Portals, ERP/CRM/SCM Integration, Database Migration, Financial Modeling," EvolveWare, Inc., Brochure, May 1, 2007, 2 pages.
Wiazowski, H., "Computer Associates, EvolveWare, Inc.: A Partnership—Exploring Opportunities," EvolveWare, Inc. PowerPoint Presentation, 2003, 30 pages.
Wong, B. W., "Automated Migration of Legacy Systems," EvolveWare, Inc., Cobol/CICS/VSAM Systems, Open Source Java Platform, PowerPoint Presentation, 2003, 11 pages.
"Legacy Rejuvenator™—Cobol Business & Data Discovery (CBDD) User Manual, Ver 1.0.0.3/RC" EvolveWare, Inc. Revision No. 3, Dec. 14, 2004, pp. 1-92.
PCT International Search Report, PCT/IN2004/000385, Jul. 22, 2005, 2 pages.

* cited by examiner

KNOWLEDGE EXTRACTION AND ABSTRACTION

CROSS REFERENCE TO RELATED APPLICATIONS

This application claims benefits of U.S. Provisional Application No. 60/781,214, filed Mar. 9, 2006, and U.S. Provisional Application No. 60/797,522, filed May 3, 2006, both of which are incorporated by reference in their entirety.

This application is related to U.S. patent application Ser. No. 10/582,839, filed Jun. 14, 2006, which is hereby incorporated by reference in its entirety.

This application is related to U.S. Utility patent application Ser. No. 11/684,580, entitled "Contextual Pattern Decoder Engine", filed Mar. 9,2007, by Miten Marfatia and Ajay M. Rambhia, and U.S. Utility patent application Ser. No. 11/684,579, entitled "Pattern Abstraction Engine", filed Mar. 9, 2007, by Miten Marfatia and Ajay M. Rambhia, both of which are incorporated by reference in their entirety.

BACKGROUND

1. Field of Art

The present disclosure generally relates to software automation tools, and more specifically, to knowledge abstraction.

2. Description of the Related Art

Many business software applications developed in legacy code are still used by companies to manage their daily operations. Some of these applications date back to 1970's or even earlier. Legacy code is application source code that relates to code that has limited or no documentation of the business rules or knowledge embedded within the code or is no-longer supported by the publisher. Thus, based on the applicability or importance of this legacy code, there has been a need to migrate this code from older versions to more current versions. Further, in some instances, there has been a need to migrate this legacy code from an older software platform that may no longer be supported to a more current software platform that presently may have wider industry acceptance.

Traditionally, people have attempted to study the source code of these software applications to understand the embedded business knowledge and/or to migrate the applications. However, this approach is both labor-intensive and vulnerable to human errors. To add to this problem, these aging software applications generally do not have adequate documentation, and therefore, increase the cost of the migration process even further. This is because it is very difficult to discover, recognize and extract all the embedded business knowledge from diverse systems in totality. Another problem with the traditional approach is that in instances where automation tools are used to aid the manual migration process, the output produced is non-flexible and proprietary. In addition, with the traditional approach, the same methodology is not adaptable to migration of software applications developed in different computer languages, thereby limiting its long-term applicability and usability.

Thus, the present state of the art lacks a system and process to automatically extract business knowledge from a collection of data. Moreover, it lacks an automated process to use this information in order to migrate between versions or platforms.

SUMMARY

The disclosure includes a system and method for learning (or discovering and extracting) business knowledge from a collection of source code. The collection of source code is abstracted to generate an abstracted data stream, which is then transformed to another format, for example, an Extensible Markup Language (XML) format. The transformed data in XML format can be further converted to target formats or processed to satisfy different needs such as software system documentation, migration, impact analysis and security analysis.

Also disclosed is an embodiment of a pattern abstraction engine configured to receive an input data stream and format it for abstraction into a standard format using a pattern matching mechanism. The abstraction allows the stream to be represented in a format that uses standard notations and/or keywords and hence can be optimally processed. The pattern abstraction engine is also configured to clean and optimize the abstracted data stream and return it to the calling component/process.

Further disclosed is an embodiment of a contextual pattern decoder engine configured to extract knowledge attributes and contextual taxonomy from classified blocks of an input data stream. In one embodiment, the contextual pattern decoder engine extracts knowledge attributes corresponding to variables and data entities identified throughout the input data stream from the classified blocks. The contextual pattern decoder engine is also configured to transform the input data stream into target data stream using target specifications and the extracted knowledge attributes and contextual taxonomy. In addition, the contextual pattern decoder engine is configured to create, store and apply taxonomy to the classified blocks.

The disclosure includes an embodiment of an input abstraction and first level classification process. The process includes receiving an input data stream, generating a standard data stream by removing unreadable characters from the input data stream, identifying knowledge elements in the standard data stream using predefined patterns, marking contexts in the standard data stream, classifying the knowledge elements as data entity patterns or business rule patterns, grouping the knowledge elements and/or blocks into logical blocks using predefined patterns, and identifying knowledge attributes with related contextual taxonomy in the standard data stream.

The disclosure also includes an embodiment of a variable tracing and second level classification process. The process includes dividing knowledge elements of the input data stream using predefined patterns, marking the knowledge elements with contextual information, classifying the divided knowledge elements, and generating the abstracted data stream. This process can provide various functionalities in combination with the input abstraction and first level classification process described above.

The disclosure also includes an embodiment of a generic XML generation and code refinement process. The process includes identifying XML patterns matching an abstracted data stream, marking contexts on the abstracted data stream, and converting (or transforming) the abstracted data stream into a generic XML data stream. This process can provide various functionalities in combination with the processes described above.

The disclosure also includes an embodiment of a components and objects generation process. The process includes marking a generic XML data stream based on behavior patterns, deriving a component or an object based on the marking, and determining connectivity (or linkage) of the derived component or object. This process can provide various functionalities, such as generating objects and components based on the source code of a software application, in combination with the processes described above.

The disclosure also includes an embodiment of a security analysis process. The process includes identifying a context of a second-level classified stream (e.g., a data stream in abstracted form with contextual markings that identify subdivided knowledge elements) using a user defined rule, classifying the second-level classified stream based on the identified context and a classification pattern, and verifying the classified second-level classified stream. This process can provide various functionalities, such as conducting security analysis, in combination with the processes described above.

The disclosure also includes an embodiment of an impact analysis process. The process includes marking a classified second-level classified stream using a user defined rule, classifying the classified second-level classified stream using the marking and the user defined rule, generating a standard representation of the classified second-level classified stream, and conducting a comparative analysis of the standard representation and a standard representation of the same or another data stream. This process can provide various functionalities, such as conducting comparative analysis of snapshots of an input data stream, in combination with the processes described above.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description and the appended claims, when taken in conjunction with the drawings (figures) follow below.

FIG. (FIG.) 1A illustrates one embodiment of a high-level block diagram of a computing system configured to process an input data stream.

DETAILED DESCRIPTION

Figure 1A:
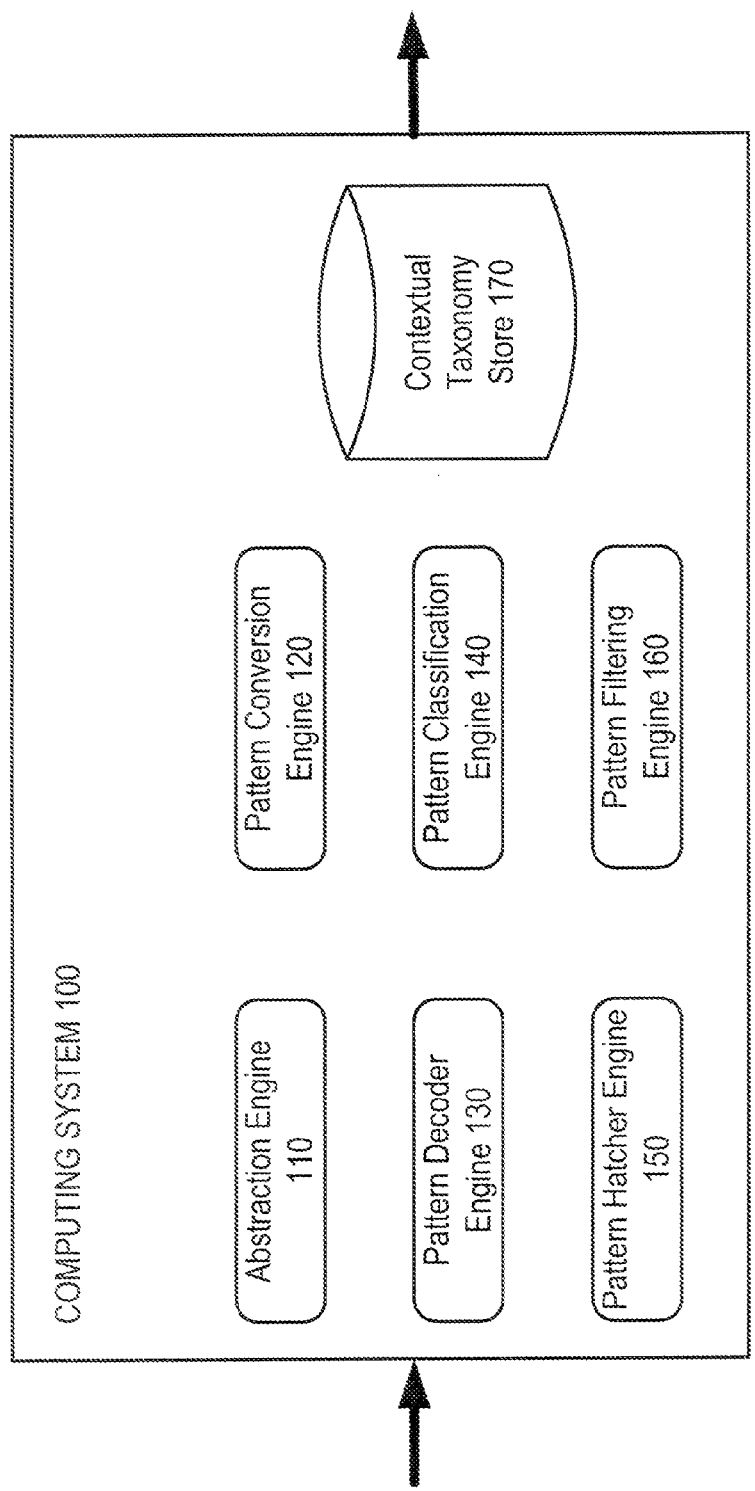
FIG. 1B illustrates one embodiment of a high-level block diagram illustrating a functional view of the computing system of FIG. 1A.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles described herein.

System Overview

It is noted that in the embodiments described herein, patterns may be formed by combining lexical compositions of source language syntaxes. These compositions may be represented in generic formats using, for example, keywords and wildcard characters. A pattern may comprise any number of wildcards and may also use multiple wildcards depending on, for example, language complexity. The generic pattern wildcards used, include, but are not limited to, "*", "~", "/", "\". Note that in one embodiment a pattern applies to a formatted string with wildcards that can be used to identify a match or base template with another string.

For example, a pattern can be represented as "KEYWORD_A * [~]". In this example, KEYWORD_A is the keyword that might occur in the input data stream, such as "DELETE". In one embodiment, a KEYWORD dictionary provides information about how the keyword affects the variable "*". "*" and "~" are wildcard characters representing a particular type of variable information. In this case the "*" wildcard may specify a variable name and "~" may specify the index of that variable. Therefore, the pattern can match array variables in the input data stream.

A pattern matches a piece of text (or data) if the piece of text satisfies all the restrictions of the pattern. For example, "MOVE A TO B" matches the pattern "MOVE * TO *" because the text matches the keywords and the wildcards in the pattern. The text, however, does not match the pattern "MOVE * TO *, *, *" because it does not include the two comma signs required by the pattern.

Depending on how it is used, a pattern can be categorized differently. For example, when a pattern is used to interpret multiple statements in a block, it can be referred to as a block pattern. When the same pattern is used to classify an input data stream based on specific parameters, it can be referred to as a classification pattern. The pattern can also be referred to as a behavior pattern when it is used to extract behavioral attributes. For example, the pattern "KEYWORD_A * [~]" is referred to as a decoding pattern when it is used to decode information such as the variable name represented by "*". The pattern is referred to as an analysis pattern when it is used to analyze what action is performed on the variable identified by "* [~]."

A pattern can have more than one set of patterns. For example, abstraction patterns and transformation patterns can specify two sets of patterns mapped to one another. An example of an abstraction or transformation pattern is: {"KEYWORD_A * [~]", "KEYWORD_B * {~}"}. When performing abstraction or transformation, if data is found in the input data stream in the form of "KEYWORD_A * [~]", then the discovered data will be abstracted or transformed using "KEYWORD_B * {~}".

A pattern can be dynamically generated (called dynamic pattern), otherwise it is referred to as a predefined pattern. A predefined pattern that is globally applicable is referred to as a master pattern. It is noted that in one embodiment, references to "pattern" herein may be related to such strings with wildcards and not necessarily to conventional software architectural patterns. Conventional patterns may refer to conventional predefined architectures and/or component specifications or layouts that specify a mechanism to design software systems.

Further, it is noted that in one or more embodiments, context is defined as a set of information that specifies the basis by which an input data stream is to be interpreted, marked and processed. That is, if an input data stream is within the context of a "Trading System", then the stream would be interpreted by the parameters that govern a trading system. Context information (also may be referenced as contextual information) is specific to a domain or specialty environment, and includes knowledge attributes and their relationships to standard parameters of that domain or specialty environment. Knowledge attributes are descriptive data elements by which an input data is interpreted. The relationship of these attributes to standard parameters of a domain or specialty environment is called taxonomy. Context information in any input data stream is extracted and marked using reference context information for the domain or specialty environment under which the input data stream is to be interpreted. This reference context information is available as predefined patterns.

Further, it is noted that in one or more embodiments, attributes are defined as any data in the input data stream that provides useful information on the entire data stream. Each piece of useful information that is derived from the data stream is termed a knowledge element. A knowledge element may contain one more knowledge elements. Examples of knowledge elements are keywords or groups of keywords that occur in a definite sequence in the input data stream. Each such sequence may specify an attribute. As an example, consider the keywords ADD, MOVE, and SUBTRACT. These keywords together may specify a "Change Variable" attribute as all statements that have these keywords are changing the value of a variable. It is also possible for each of these keywords to have different attributes. For example, the keyword ADD may have an attribute of "Increase Variable Value", MOVE may have an attribute of "Replace Variable Value" and SUBSTRACT may have an attribute of "Decrease Variable Value". The attributes may be formed by extracting keywords and language dependent descriptions from input supplied. The attributes may include code comments, functions, procedures, routine definition strings, parameter name strings, and main control blocks in the code for structures (e.g., if-else, do-while, while). The attributes may also comprise database schemas, data file definitions and formats, and data entity definitions (including variable names, data types and size). This collection of attributes, which can also be termed as "dynamic knowledge dictionary," may be used to generate data interaction and business logic on the output side of a process in one embodiment. Business logic may be business rules for the application embedded in the input supplied.

It is noted that in one or more embodiments, rules describe tasks to be performed. The rules can be derived using various types of predefined patterns, such as classification patterns, decoding patterns and abstraction patterns. Patterns form the basis for extraction of knowledge attributes. An assembly of knowledge attributes results in the formation of business rules.

A rule may be named by the task that rule is going to perform. There are user defined rules which are defined by the user to perform specific tasks such as comparative analysis, classification and transformation. These rules are called analysis rules, classification rules and transformation rules, respectively. The following is an example of a transformation rule which transforms an array type variable into a format of "variable name [key]":

```
IF Variable IS OF TYPE Array THEN
    TRANSFORM it using VAR [KEY] format
END IF
```

Also, it is noted that in one or more embodiments, fuzzy rules (also may be referenced as dynamic rules or fuzzy-neural rules) take decisions at run-time using a set of predefined patterns. The fuzzy rules may comprise rules that use fuzzy sets and decision making processes. In addition, it is noted that in one or more embodiments, pattern matching may be a process by which a pattern is derived to represent a data stream to facilitate decoding information from the data stream. Further, it is noted that in one or more embodiments, pattern hatching may be a process by which new patterns are created or formed at runtime. That is, patterns are "hatched" to generate new patterns when a required one is not available.

In addition, it is noted that in one or more embodiments, a segment may be a storage place similar to a table in a relational database or, for example, an Extensible Markup Language (XML) file stored in a XML database. The segment may comprise a predefined storage area that may be referenced and used to record data in specific format. The segment may also facilitate retrieval of the data using a query method using, for example, Structured Query Language (SQL) and/or XML-based queries (XQuery). It is noted that in one or more embodiments, a segment of a data stream (or data set) refers to a statement in the data stream.

Furthermore, it is noted that in one or more embodiments, a block may be a single statement or a group of statements appearing in an input data stream that perform a logical function. For example, the following conditional block includes multiple statements:

```
IF A = B THEN
    SET A TO B
END IF
```

The conditional block above includes an IF statement and a secondary SET statement. Further, there may be several such secondary statements within this block. The block, in general, may serve some business function. It is analogous to writing a business rule in program code format. Predefined block patterns are used to extract blocks from the input data stream. The blocks can be classified based on the operations they perform. Primary decoding patterns are used to determine if the extracted block contain variables or not. A match with a primary pattern will indicate the presence of a variable or variables in an extracted block pattern. Each logical block might contain one or more blocks. Predefined classified patterns are applied to logical blocks so as to combine them to form business rules. Logical blocks are re-used and may appear in multiple business rules depending on the command keywords and/or variables that are incorporated in them.

It is noted that in one or more embodiments, target attributes (or target specifications) are attributes that specify the general layout of the target data or code that is to be generated. These attributes are set by predefined rules or user input, and they are stored in a knowledge base as records. Target attributes may be thought of as specifications of the format or template or structure in which target data or code is to be generated. In one embodiment, the target attributes have reference context information that provides guidance on how the target data or code is to be generated. The target reference context information specifies the structure and layout of the generated target data or code based on the extracted knowledge attributes and contextual taxonomy marked in input code or data stream. The following is an example of a target architecture:

```
<TargetAttributeSpecifications>
    <TargetStructure>Package</TargetStructure>
    <DescriptionLayout>
        <Package>
            <PackageName>Customer Order Operations</PackageName>
            <PackageAttributes>Customer Order Record</PackageAttributes>
            <PackageDataEntities>
                <DataEntity>Customer_Record</DataEntry>
                <DataEntity>Customer_Order_Master_Record</DataEntry>
                <DataEntity>Customer_Order_Details_Record</DataEntry>
            </PackageDataEntities>
        </Package>
    </DescriptionLayout>
    </TargetStructure>Package</TargetStructure>
</TargetAttributeSpecifications>
```

The target architecture in the above example requires a folder structure with the folder name "Customer Order Operations". It is further required that the objects and components related to Customer Order Operations should be generated in this folder. With respect to components and objects, it is required that the components in this folder should define all the business rules that deal with Customer_Records, Customer_Order_Master_Record and Customer_Order_Detail_Records. The knowledge attributes referred to in the target attributes are items or entities appearing in the PackageDataEntities tag.

In general, embodiments described herein allow for receiving an input data stream and packaging (or formatting) the stream for abstraction into a standard format utilizing a pattern matching mechanism. Further, in one or more embodiments, a system cleans and optimizes the abstracted stream and returns the resulting code to a calling component/process for code transformation. Accordingly, in one or more embodiments, a system allows for packaging and abstraction of an input data stream. Such abstraction may allow the stream to be represented in a format that uses standard notations or keywords, and hence, can be optimally processed. Further, in one or more embodiments, a system (or method) dynamically intercepts, packages, and transforms an input data stream into a representation that is an abstract of the actual data stream.

In one or more embodiments, a knowledge engine may be used to classify an input data stream into logical blocks using predefined patterns. The grouping of the classified blocks into logical blocks allows the knowledge engine to extract knowledge attributes from an input data stream. Those skilled in the art will note that the ability to derive, extract, and classify blocks may provide a mechanism and a methodology to obtain "abstract" information about the input data stream. Further, such a technique facilitates marking knowledge, which refers to a derived entity/variable and their life cycle information.

Further, in one or more embodiments, the knowledge engine may use dynamic fuzzy-neural mechanisms and rules to perform discovery, extraction, and transformation of the input data stream. In general, the knowledge engine performs the knowledge gathering process. Further, those skilled in the art will note that because the knowledge engine may use fuzzy-neural mechanisms and rules, the knowledge engine may be "trained" to gather knowledge seamlessly across various systems and data formats.

Additionally, in one or more embodiments, a knowledge base may store collected knowledge. The knowledge base may be subdivided into several "segments," so that the knowledge collected by the knowledge engine may be stored in an organized manner. Those skilled in the art will note that the knowledge base may also be used to store rules that drive a knowledge engine at runtime.

Architectural Overview

FIG. 1A illustrates one embodiment of a high-level block diagram of a computing system 100 configured to process an input data stream. The computing system 100 includes a pattern abstraction engine 110, a pattern conversion engine 120, a contextual pattern decoder engine 130, a pattern classification engine 140, a pattern hatcher engine 150, a pattern filtering engine 160, and a contextual taxonomy store segment 170. Each of these components is further described herein and their configurations can be implemented in software, hardware, or a combination of hardware and software.

The computing system 100 receives an input data stream and sends out an output data stream. The input data stream can include a collection of structured information in one or more grammars. An example of the input data stream is source code of legacy applications. The output data stream can be equivalent to the input data stream. The output data stream can be a representation of knowledge embedded in the input data stream in one or multiple formats.

The pattern abstraction engine 110 is configured to receive an input data stream and generate an abstract representation for the input data stream (also may be referenced as an abstracted data stream of the input data stream, or the input data stream in abstract format). The abstract representation can be in several formats, such as the Generic XML format. For example, for an input data stream of "SET A B" the pattern abstraction engine 110 can transform it into an abstracted data stream illustrated below:

```
<Statement>
    <Keyword>Set</Keyword>
    <PrimaryIdentifier>A</PrimaryIdentifier>
    <SecondaryIdentifier>B</SecondaryIdentifier>
</Statement>
```

In one embodiment, the pattern abstraction engine 110 uses standard notations and/or keywords in the abstract representation to represent the knowledge embedded in the input data stream. The standard notations and keywords may vary based on the operation being performed on the input data stream. For code conversion operations, the standard notations and keywords may include: SET, IF, EXPRESSION, METHOD, FUNCTION, RETURN, CALL, ADD, SUBSTRACT, DIVIDE, READ, WRITE, UPDATE, DELETE, END METHOD, END, EXIT, and PRINT.

Figure 2:
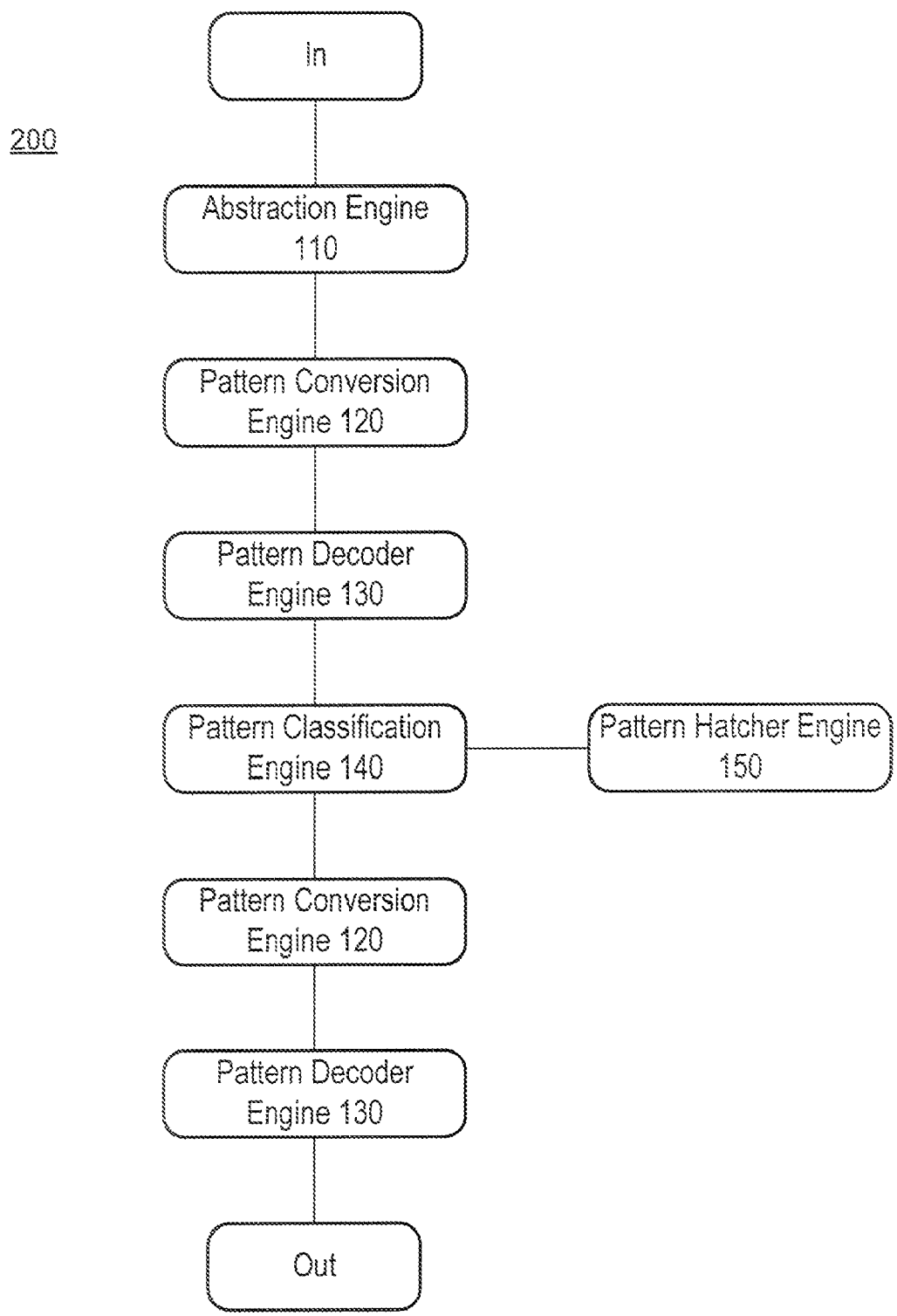
FIG. 2 is a flow diagram illustrating one embodiment of a process to perform abstraction of input data stream and first level classification of knowledge elements.

In one embodiment, which is further described herein and, for example, with respect to FIG. 2, the pattern abstraction engine 1 10 filters an input data stream to remove unreadable characters, generates a standard data stream of the input data stream, and makes the standard data stream available for the components of the computing system 100 to process. In another embodiment, for example, as further described below with respect to FIG. 4, the pattern abstraction engine 110 formats a second-level classified stream (e.g., a data stream in abstracted form with contextual markings that identify subdivided knowledge elements) to enable the generation of documentation in a suitable format. In yet another embodiment, for example, as further described below with respect to FIG. 7, the pattern abstraction engine 110 creates an abstract representation of an input data stream that has been identified and classified based on user defined rules. One example of the user defined rules is "INCLUDE Network Packet Data WITHOUT user IP Address information." The pattern abstraction engine 110 creates the abstract representation based on the example user defined rule by eliminating from the abstract representation any occurrences of Internet protocol (IP) addresses and providing only network packet data in the abstract representation. Using the same rules, the pattern abstraction engine 110 also generates an abstract representation for snapshots of the same or another input data stream. Snapshots of an input data stream can be viewed as representations of the input data stream generated by the computing system 100 at different stages during the processing of the input data stream.

The pattern conversion engine 120 is configured to transform input data stream using pattern matching mechanisms and performing pattern based conversion. In one embodiment, for example, as further described below with respect to FIG. 2, the pattern conversion engine 120 receives an input data stream that has been abstracted into a standardized format and utilizes (or uses) basic predefined patterns retrieved from the contextual taxonomy store segment 170 to extract and mark knowledge elements in the stream. In another embodiment, for example, as further described below with respect to FIG. 4, the pattern conversion engine 120 converts a second-level classified (i.e., marked for knowledge attributes and contexts) stream into generic XML using predefined XML patterns. If no matching predefined XML pattern is found, the pattern conversion engine 120 requests a matching dynamic XML pattern from the contextual pattern decoder engine 130. These dynamic patterns may be stored for future use and considered as predefined patterns. In another embodiment, for example, as further described below with respect to FIG. 5, the pattern conversion engine 120 marks a generic XML stream based on similarity in behaviors of data entities and/or variables using predefined behavior patterns. Behavior patterns allow variables and/or data entities within the input data stream to be identified based on the functions they perform. For example, a variable may behave as a data element (or entity) or as an array. Once the behavior attributes have been identified for a data entity or a variable and marked for the data entity or variable in the input data stream, code segments (or blocks) that contain data entity and/or variables with similar behavior are grouped together using predefined behavior patterns. If no matching predefined behavior pattern is found, the pattern conversion engine 120 requests a matching dynamic behavior pattern from the pattern hatcher engine 150.

In another embodiment, for example, as further described below with respect to FIG. 6, the pattern conversion engine 120 (1) sends the input data stream to the contextual pattern decoder engine 130 where the contexts (or contexts set), based on the user defined rules, are identified and marked, (2) stores a copy of the stream with identified contexts in the contextual taxonomy store segment 170, (3) sends the stream with identified contexts to the pattern classification engine 140 which returns a classified input data stream with identified contexts, and (4) ensures that the the classified input data stream has been marked as per the contexts. In another embodiment, for example, as further described below with respect to FIG. 7, the pattern conversion engine 120 uses user defined comparative analysis rules to match predefined analysis patterns to multiple data streams in a package. The multiple data streams may be snapshots of the same input data stream abstracted using the user defined comparative analysis rules. If no matching predefined analysis pattern is found, the pattern conversion engine 120 requests a matching dynamic analysis pattern from the pattern hatcher engine 150.

The contextual pattern decoder engine 130 is configured to extract knowledge attributes with their contextual information from an input data stream. The contextual pattern decoder engine 130 is also configured to create knowledge attributes corresponding to variables and data entities identified throughout the input data stream. Further, the contextual pattern decoder engine 130 is configured to transform the input data stream into target data using the extracted knowledge attributes and contextual taxonomy. In addition, the contextual pattern decoder engine 130 is configured to create, store and apply taxonomy to blocks in the input data stream.

In one embodiment, for example, as further described below with respect to FIG. 2, the contextual pattern decoder engine 130 marks contexts in the input data stream using contextual markings and verifies the contextual markings after the pattern classification engine 140 classifies the stream and after the pattern conversion engine 120 repackages and marks the stream as further described below. In another embodiment, for example, as further described below with respect to FIG. 3, the contextual pattern decoder engine 130 processes a first-level classified stream (e.g., a data stream in abstracted form with contextual markings that identify knowledge elements) to divide (or subdivide) knowledge elements in the stream using predefined decoding patterns (or predefined knowledge element patterns), mark them with context information, and store them in the contextual taxonomy store segment 170. If no matching predefined decoding pattern is found, the pattern decoder engine 130 requests a matching dynamic decoding pattern from the pattern hatcher engine 150, and uses the dynamic pattern to divide the knowledge elements.

In one embodiment, for example, as further described below with respect to FIG. 4, the contextual pattern decoder engine 130 marks the contexts on the input data stream using predefined patterns before sending the input data stream to the pattern hatcher engine 150 to obtain a matching pattern. In another embodiment, for example, as further described below with respect to FIG. 5, the contextual pattern decoder engine 130 determines the linkages (or connectivity) between the components and objects based on (1) the context information of the component and objects and (2) associated target attribute specifications. In another embodiment, for example, as further described below with respect to FIGS. 6 and 7, the contextual pattern decoder engine 130 identifies contexts in an input data stream based on the user defined rules and makes context markings in the stream.

The pattern classification engine 140 is configured to detect and classify extracted blocks in a data stream into logical blocks based on predefined patterns. In one embodiment, a logical block represents a business rule from which knowledge attributes may be extracted. The pattern classification engine 140 is also configured to discover (or derive) and extract block information to create (or generate) an abstract view of the data stream. The pattern classification engine 140 is also configured to identify blocks in an input data stream using predefined block patterns and interpret the stream in a dynamic manner using classification patterns and target attributes.

In one embodiment, for example, as further described below with respect to FIG. 2, 3, 6 and 7, the pattern classification engine 140 uses predefined classification patterns and contextual information provided by the contextual pattern decoder engine 130 to classify the knowledge elements in the input data stream extracted by the pattern conversion engine 120. This classification is performed using predefined classification patterns and/or user defined rules. In one embodiment, the knowledge elements may be classified based on the operations they perform. For each extracted pattern, if no matching predefined classification pattern is found, the pattern conversion engine 120 requests a matching dynamic classification pattern from the pattern hatcher engine 150.

In another embodiment, for example, as further described below with respect to FIG. 4, the pattern classification engine 140 is configured to use predefined classification patterns to verify that a data stream already converted into a generic XML format has its classification markings intact. The classification markings may highlight the classification attributes of the input data stream. During the process of verification, the pattern classification engine 140 removes knowledge elements that do not have context associated with them. A knowledge element with no associated context has no bearing to the context under which the input data stream is being processed, and hence, is considered redundant (or dead code). In another embodiment, for example, as further described below with respect to FIG. 5, the pattern classification engine 140 creates (or extracts or derives) components and objects for a data stream based on behavior pattern markings and target attribute specifications.

The pattern hatcher engine 150 is configured to create new patterns as required for transforming (or matching) an input data stream using dynamic rules in combination with fuzzy-neural rules (collectively called "pattern hatching"). The pattern hatcher engine 150 can also be configured to utilize fuzzy rules to determine the accuracy of and validate a dynamically hatched pattern. In one embodiment, for example, as further described below with respect to FIGS. 2-7, the pattern hatcher engine 150 can hatch new patterns from predefined master patterns using fuzzy rules. For example, the pattern hatcher engine 150 can use fuzzy rules to identify a predefined master pattern to hatch the new pattern.

The pattern filtering engine 160 is configured to determine whether a newly created pattern by the pattern hatcher engine 150 should be stored in the contextual taxonomy store segment 170. In one embodiment, for example, as further described below with respect to FIGS. 3-7, the pattern filtering engine 160 applies fuzzy rules to determine the relevance of each hatched pattern for future use. Based on the relevance, the pattern filtering engine 160 assigns a weight to that pattern based on which the pattern is either saved in the contextual taxonomy store segment 170 or discarded after use.

The contextual taxonomy store segment 170 is configured to provide a storage space to facilitate storing information such as knowledge attributes that are discovered in a data stream. In one embodiment the contextual taxonomy store segment 170 includes taxonomy store sections and contextual store sections. The taxonomy store sections store taxonomy elements (e.g., classification elements) such as variable and entity names derived from the data stream. These elements are mapped into aliases in the output data stream. The mapping information can also be stored in the contextual taxonomy store segment 170. The contextual store section stores contextual attributes (e.g., circumstances and conditions which "surround" an event) derived from the input data stream. The contextual attributes includes the context usages and classifications of taxonomy elements (e.g., variables and data entities) in their life cycles. It is noted that the contextual taxonomy store segment 170 may be a relational database or any other type of database or a flat computer file.

Figure 1B:
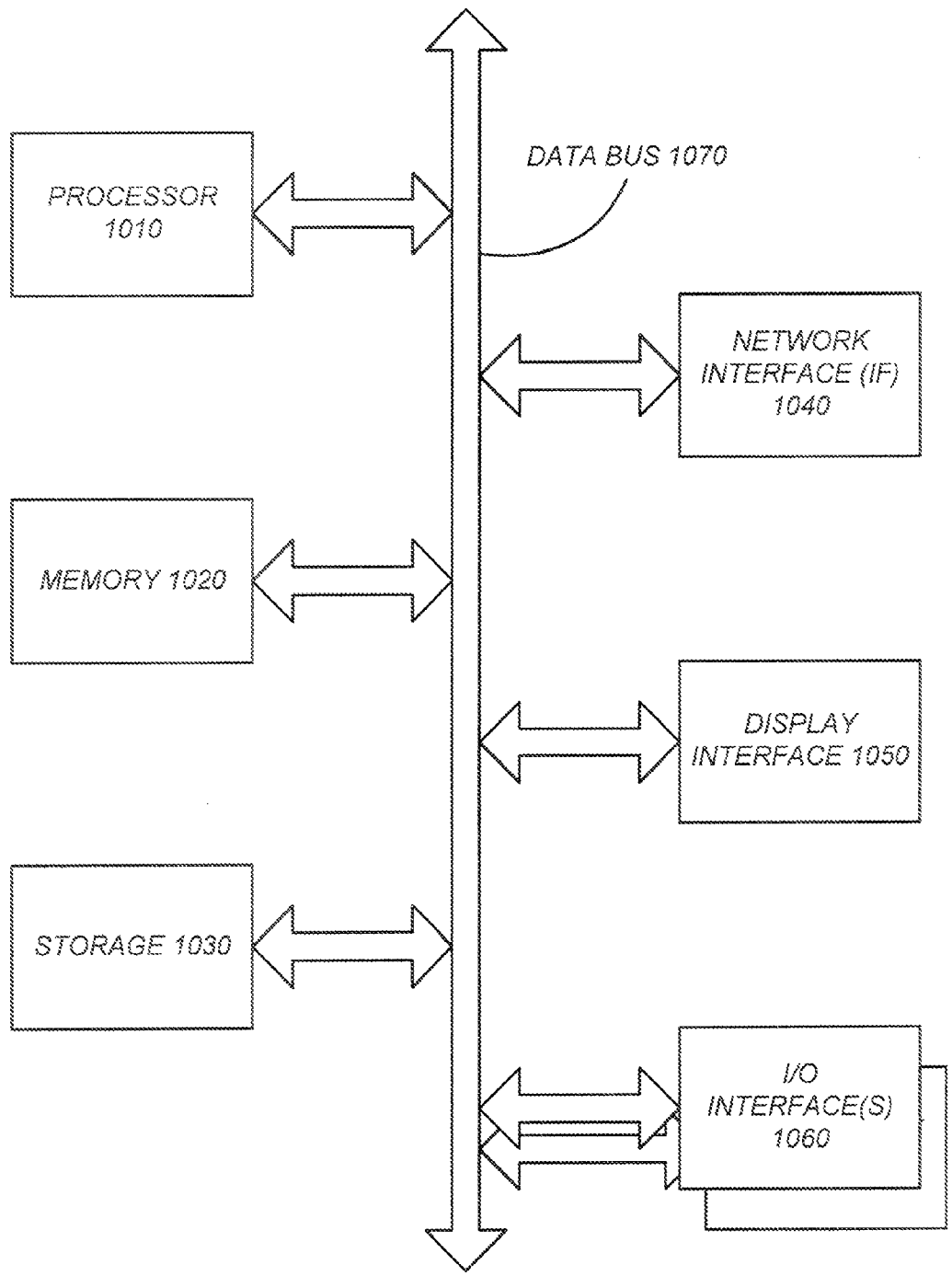

FIG. 1B is a high-level block diagram illustrating an example of an embodiment of a functional view of the computing system 100 of FIG. 1A. The components described previously in FIG. 1A and further herein, may be configured as software (e.g., modules that comprise instructions storable on a computer readable medium and executable by a processor), hardware (e.g., an application specific integrated circuit), or a combination thereof. The software and/or hardware may operate in a computer system configured as described in the example embodiment if FIG. 1B. The computer system includes a processor 1010, a memory 1020, a storage 1030, a network interface (IF) 1040, a display interface 1050, and one or more other input/output (IO or I/O) interfaces 1060. The processor 1010, the memory 1020, the storage 1030, the network interface 1040, the display interface 1050, and the input/output interfaces 1060 are communicatively coupled through a data bus 1070.

The processor 1010 is a conventional processor, for example, a complex instruction set computing processor (e.g., an Intel® Pentium® processor or AMD Athlon™ processor), a reduced instruction set computing processor (e.g., an IBM® PowerPC processor or Sun® SPARC® processor), or a specialized or highly optimized processor (e.g., IBM/Toshiba/Sony Cell Processor). The processor is configured to run a conventional operating system, e.g., Microsoft® Windows™ or Windows CE or Windows Mobile, Linux, Lindows, Apple® OS X, IBM MVS or VM, Sun Microsystems® Solaris™, or Palm Source® Palm OS. The processor 1010 with operating system is configured to execute instructions corresponding to the steps of processes disclosed herein. The processes 1010 disclosed herein may be structured as instructions using conventional computer programming tools, e.g., programming languages, compilers, and the like.

The memory 1020 is a conventional memory, for example, a dynamic random access memory (DRAM), a static random access memory (SRAM), or a synchronous DRAM (SDRAM). The memory 1020 is configured to store (e.g., temporarily during operation of the processor) information, for example, instructions, data, etc. The storage 1030 is a conventional storage medium, for example, a magnetic storage (e.g., magnetic hard drive), an optical storage (e.g., a CD or DVD based drive and medium), or solid state storage (e.g., a flash memory or electrically erasable programmable read only memory). The storage 1030 is configured to store information such as instructions and data, as well as a database, e.g., the contextual taxonomy store segment 170. Note that the memory 1020 and the storage 1030 are examples of computer readable medium (or storage media).

The network interface 1040 is a conventional network interface for connecting with a wired (e.g., Ethernet) or wireless (e.g., WiFi or other IEEE 802.11, WiMax or other IEEE 802.16, or Bluetooth) network through a communication protocol. Examples of networks that the network interface 1040 could communicatively couple include wide area networks such as an Internet or local area networks such an Intranet. An example of a communication protocol is TCP/IP. The display processor 1050 is a conventional display processor configured to drive data, for example, still and motion text, images and graphics to a visual display. The input/output interfaces 1060 are conventional input/output interfaces for use with the computing system, for example, an audio interface (e.g., microphone and/or a speaker), or I/O ports such as a universal serial bus (USB) interface or an IEEE 1394 (e.g., Apple® FireWire) interface.

Input Discovery

A. Input Abstraction and First Level Classification Process

The flow diagram shown in FIG. 2 illustrates one embodiment of a process 200 to abstract an input data stream and perform initial classification of its knowledge attributes (e.g., first level classification of knowledge attributes). This abstraction and classification allows the next process, the process illustrated in FIG. 3 and described below, to derive contextual information from the input data stream.

As set forth above with reference to FIG. 1A, the input data stream can include a collection of structured information. The input data stream can have embedded knowledge, such as business rules (also may be referenced as business logic or business processes), data models, and program logic. The input data stream can be in multiple formats and can include multiple data streams. For example, an input data stream may include source codes for multiple software applications written in different programming languages.

The process 200 starts with the pattern abstraction engine 110 receiving an input data stream. Illustrated below is an exemplary input data stream.

```
MOVE A TO B.
IF B = 10
    MOVE 10 TO C.
```

The above input data stream contains two statements. The first statement assigns the value of a variable A to a variable B, and the second statement is a conditional statement that assigns a variable C a value of 10 if the value of B equals 10.

The pattern abstraction engine 110 generates a standard data stream by filtering the input data stream to remove unreadable characters. The pattern abstraction engine 110 passes the standard data stream to the pattern conversion engine 120. The pattern conversion engine 120 (1) uses predefined patterns to extract knowledge elements from the standard input data stream, (2) marks the knowledge elements with knowledge attributes, (3) appends the knowledge elements to the standard data stream, and (4) passes the standard data stream together with the appended knowledge elements to the contextual pattern decoder engine 130. The contextual pattern decoder engine 130 marks (or tags or flags) contexts (also may be referenced as contextual information, context attributes) in the standard data stream, and passes the standard data stream with the contextual markings to the pattern classification engine 140. The pattern classification engine 140 utilizes predefined classification patterns and the contextual markings to classify the knowledge elements in the input data stream attached by the pattern conversion engine 120. If any of the extracted knowledge elements attached by the pattern conversion engine 120 to the input data stream does not match any of the predefined classification patterns, the pattern classification engine 140 requests the pattern hatcher engine 150 to hatch a matching dynamic classification pattern. The pattern hatcher engine 150 hatches one or more dynamic classification patterns from predefined master patterns using fuzzy rules, and passes back the hatched classification patterns to the pattern classification engine 140, which classifies the input data stream using the hatched classification patterns.

The pattern classification engine 140 passes the classified patterns (or classified blocks) back to the pattern conversion engine 120, which re-packages the input data stream with the classified patterns into a first level classified input data stream in abstracted form with contextual markings that identify knowledge elements within it (also may be referenced as a first-level classified stream). Re-packaging of a data stream may involve extraction and marking of knowledge elements. Alternatively, re-packaging may mean a realignment (or reposition or renaming) of data.

The pattern conversion engine 120 passes the first-level classified stream to the contextual pattern decoder engine 130, which verifies the contextual markings in the first-level classified stream and outputs it to the caller of the process 200. In one embodiment, the contextual pattern decoder engine 130 performs the verification to ensure that all the contextual markings it marked in the stream have remained intact. Thus, the process 200 outputs an abstract representation (also may be referenced as an abstracted data stream) of the input data stream with contextual information marked and knowledge elements identified.

Continuing with the above input data stream example, the process 200 processes the input data stream and generates an output data stream as illustrated below:

```
<Statements>
    <Statement>
        <VarChange>
            <ReplaceVariableValue>
                MOVE
                <Variable>A</Variable>
                TO
                <Variable>B</Variable>
            </ReplaceVariableValue>
        </VarChange>
    </Statement>
    <Statement>
        <BlockType>
            <ConditionalCheck>
                IF
                <Variable>B</Variable>
                <Operator>=</Operator>
                <Constant>10</Constant>
            </ConditionalCheck>
            <Statement>
                <VarType>
                    <ReplaceVariableValue>
                        MOVE
                        <Variable>10</Variable>
                        TO
                        <Variable>C</Variable>
                    </ReplaceVariableValue>
                </VarType>
            </Statement>
        </BlockType>
    </Statement>
</Statements>
```

As illustrated above, the output stream of the process 200 is an abstracted data stream with contextual markings that identify knowledge elements within it. For example, the statement "MOVE A TO B" is classified as VarType (Variable Operation Type), and the statement "IF B=10 MOVE 10 TO C" is classified as BlockType (Block Statement Type). As an example of the marked knowledge element, A, B, and C are marked as variables, and the keyword MOVE is marked as ReplaceVariableValue. It is noted that the process 200 can provide various functionalities in combination with other processes as described in more detail herein.

B. Variable Tracing and Second Level Classification Process

Figure 3:
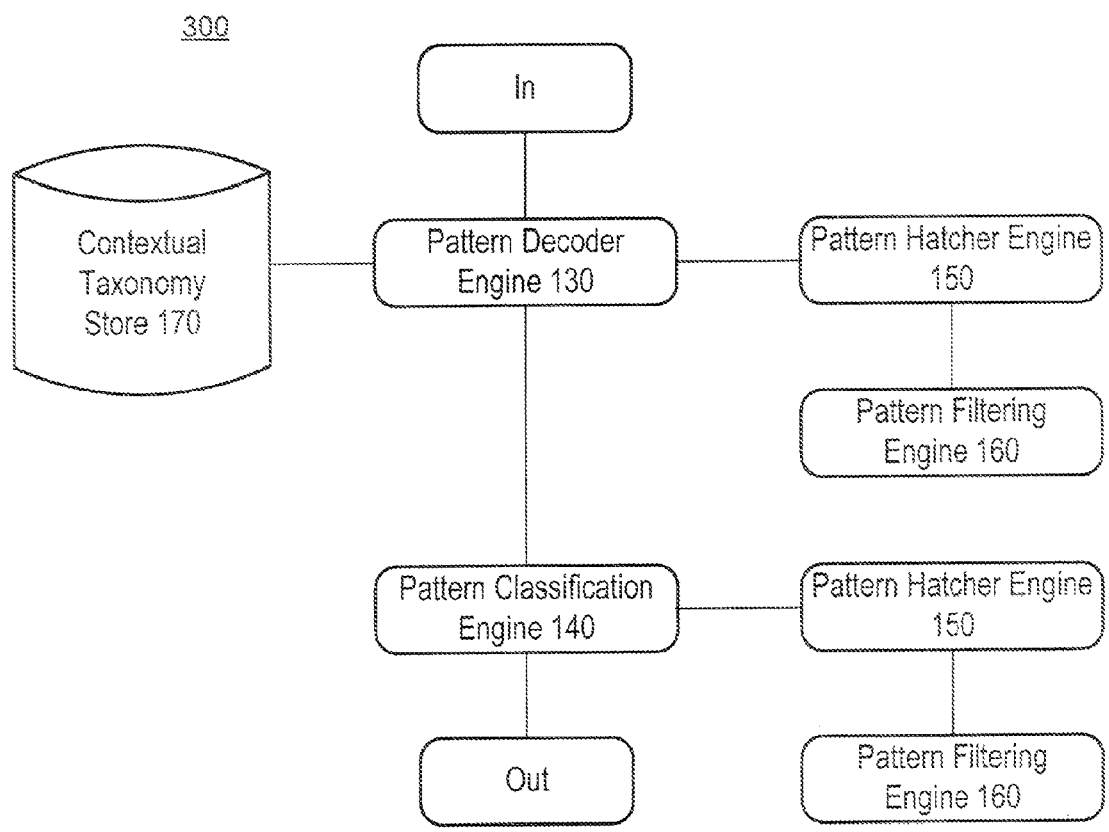
FIG. 3 is a flow diagram illustrating one embodiment of a process to trace variables and use the trace information for second level classification of knowledge elements.

The flow diagram shown in FIG. 3 illustrates one embodiment of a process 300 to trace variables in the first-level classified stream and to classify the first-level classified stream further to generate details of knowledge embedded in the stream (e.g., second level classification of knowledge attributes). In one embodiment, the input data stream of the process 300 is the output data stream of the process 200.

The process 300 starts with the contextual pattern decoder engine 130 processing the first-level classified stream to subdivide the knowledge elements using predefined decoding patterns. The process 300 marks (or tags or flags) the subdivided knowledge elements with context information and stores them in the contextual taxonomy store segment 170. If a knowledge element pattern does not match any of the predefined decoding patterns, the contextual pattern decoder engine 130 requests a matching dynamic decoding pattern from the pattern hatcher engine 150. The pattern hatcher engine 150 hatches one or more new decoding patterns using predefined fuzzy rules and passes the hatched decoding patterns to the pattern filtering engine 160. The pattern filtering engine 160 also applies fuzzy rules to determine whether to save the hatched decoding patterns in the contextual taxonomy store segment 170 or to discard them after use. After receiving the hatched decoding patterns from the pattern hatcher engine 150, the contextual pattern decoder engine 130 subdivides the knowledge elements using the hatched decoding patterns. The contextual pattern decoder engine 130 also tags the subdivided knowledge elements with context information in the data stream. The contextual pattern decoder engine 130 then passes the data stream to the pattern classification engine 140 for second level classification of the input data stream.

The pattern classification engine 140 once again uses predefined classification patterns to classify the subdivided knowledge elements received from the contextual pattern decoder engine 130. In one embodiment, the pattern classification engine 140 also classifies blocks in the data stream into logical blocks (e.g., business rules). If the data stream received from the contextual pattern decoder engine 130 does not match any of the predefined classification patterns, the pattern classification engine 140 once again requests a matching dynamic classification pattern from the pattern hatcher engine 150. The pattern hatcher engine 150 hatches new dynamic classification patterns and requests the pattern filtering engine 160 to determine whether to save the hatched patterns in the contextual taxonomy store segment 170, as set forth above. The pattern classification engine 140 classifies the data stream received from the contextual pattern decoder engine 130 using the hatched classification patterns returned from the pattern hatcher engine 150, generates a second level classified input data stream in abstracted form with contextual tag marks that identify the subdivided knowledge elements within it (e.g., second-level classified stream), and outputs it to the caller of the process 300.

In one embodiment, the output data stream (an abstracted data stream) of the process 300 is a presentation of knowledge (e.g., business rules, program logic, and data model) embedded in the input data stream in another representation in formats such as a generic XML format. This generic XML presentation may be displayed (or presented) in different formats. For example, program logic in the embedded knowledge can be displayed graphically as a flow diagram or expressed in pseudo software code (also may be referenced as pseudo program language). As another example, business rules in the embedded knowledge can be described in text, or displayed graphically as a flow diagram. In still another example, a data model can be shown as SQL/DDL scripts.

Continuing with the input data stream example, the process 300 receives the output stream of the process 200 as input data stream, and generates an output data stream as illustrated below:

```
<Statements>
    <Statement>
        <ReplaceVariableValue>
            <PrimaryVariable>A</PrimaryVariable>
            <SecondaryVariable>B</SecondaryVariable>
        </ReplaceVariableValue>
    </Statement>
    <Statement>
        <ConditionalBlockType>
            <ConditionalCheck>
                <Variable>A</Variable>
                <Operator>=</Operator>
                <Variable><IsConstant>10</IsConstant></Variable>
            </ConditionalCheck>
```

```xml
    <Statement>
      <ReplaceVariableValue>
        <PrimaryVariable>C</PrimaryVariable>
        <IsConstant>10</IsConstant>
      </ReplaceVariableValue>
    </Statement>
  </ConditionalBlockType>
 </Statement>
</Statements>
```

As illustrated above, the output stream of the process 300 is a classified data stream in abstract format with contextual marks that identify the subdivided knowledge elements within it. For example, the variable A is marked as PrimaryVariable and the variable B is marked as SecondaryVariable. As another example, the constant value 10 is marked as IsConstant. In addition, it is noted that the process 300 described above provides a flexible architecture that can provide various functionalities in combination with other processes as described in more detail herein.

Output Transformation

A. Generic XML Generation and Code Refinement Process

Figure 4:
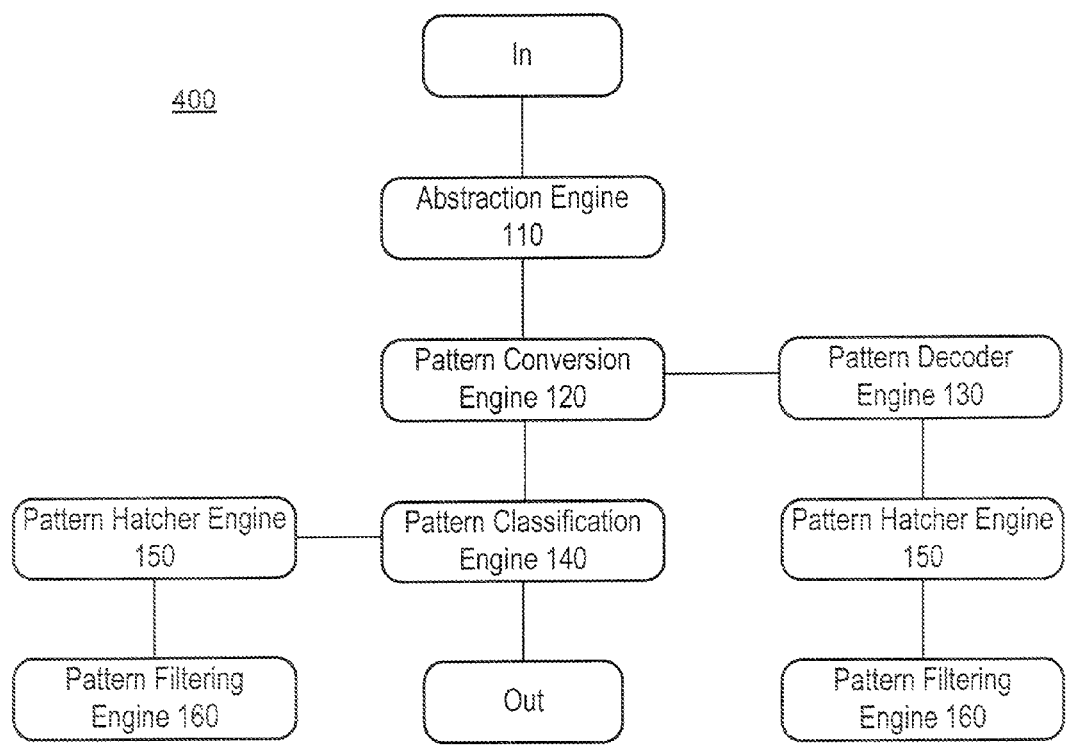
FIG. 4 is a flow diagram illustrating one embodiment of a process to generate a generic XML data stream of an input data stream and perform code refinement and filtering.

The flow diagram shown in FIG. 4 illustrates one embodiment of a process 400 to convert the second-level classified stream into a standardized representation (or format) such as the generic XML format (e.g., the standardized stream). Thereafter the process 400 performs code refinement and filtering which includes finding of reusable logical blocks and removal of redundant blocks and/or dead knowledge elements from the standardized stream. Redundant blocks are blocks that can be replaced by a re-usable block. Dead knowledge elements are elements that have no context under which the input data stream is being processed.

The process 400 starts with the pattern abstraction engine 110 formatting the second-level classified stream and marking it for conversion to generic XML. The pattern abstraction engine 110 may remove dead knowledge elements during the formatting. The pattern abstraction engine 110 may also realign contextual markings in the data stream for ease of processing. The pattern abstraction engine 110 then passes the formatted second-level classified stream to the pattern conversion engine 120. The pattern conversion engine 120 uses predefined XML patterns and contextual markings in the stream to convert the formatted second-level classified stream into a generic XML stream. If a segment of the input data stream received from the pattern abstraction engine 110 does not match any of the predefined XML patterns, the pattern conversion engine 120 requests a matching dynamic XML pattern from the pattern hatcher engine 150 through the contextual pattern decoder engine 130. The contextual pattern decoder engine 130 marks contexts on the input data stream received from the pattern conversion engine 120 before sending the segment of the input data stream without matching predefined XML patterns to the pattern hatcher engine 150 to obtain a matching pattern. If matching predefined XML patterns are found for the entire data stream, the pattern hatcher engine 150 and the contextual pattern decoder engine 130 will not be called.

The pattern hatcher engine 150 hatches new XML patterns from predefined master patterns using fuzzy rules and requests the pattern filtering engine 160 to determine whether to save the hatched patterns in the contextual taxonomy store segment 170, for example, as set forth above with respect to FIG. 3. The contextual pattern decoder engine 130 passes the hatched patterns back to the pattern conversion engine 120, which converts the formatted second-level classified stream into a generic XML stream using the hatched XML patterns. The pattern conversion engine 120 passes the generic XML stream to the pattern classification engine 140, which verifies that the first and second level classification markings have remained intact in the generic XML stream. This verification is performed using predefined classification patterns. During this process of verification the pattern classification engine 140 removes input data stream segments that do not have context associated with them and hence considered redundant (dead code removal). Similarly, the pattern classification engine 140 also marks logical blocks that are reusable. These logical blocks may be generated during the second level of classification. Once again, if a predefined matching pattern is not found, the pattern classification engine 140 uses the pattern hatcher engine 150 and the pattern filtering engine 160 to obtain a hatched matching pattern similar to the scenario explained above with respect to FIG. 3. Therefore, the generic XML stream is cleaned with the removal of dead code and optimized by marking reusable logical blocks. One example of optimizing a code segment is to restructure a conditional code "IF A NOT EQUAL to B THEN DO SOMETHING" to "IF A EQUAL TO B THEN DO NOTHING ELSE DO SOMETHING." After the verification, the pattern classification engine 140 outputs the generic XML stream (or the standardized stream) to the caller of the process 400.

Continuing with the input data stream example, the process 400 receives the output stream of the process 300 as input data stream, and generates an output data stream as illustrated below:

```xml
<Statements>
  <DeadStatement>
    <Statement>
      <ReplaceVariableValue>
        <PrimaryVariable>A</PrimaryVariable>
        <SecondaryVariable>B</SecondaryVariable>
      </ReplaceVariableValue>
    </Statement>
  </DeadStatement>
  <Statement>
    <ConditionalBlockType>
      <ConditionalCheck>
        <Variable>A</Variable>
        <Operator>=</Operator>
        <Variable><IsConstant>10</IsConstant></Variable>
      </ConditionalCheck>
      <Statement>
        <ReplaceVariableValue>
          <PrimaryVariable>C</PrimaryVariable>
          <IsConstant>10</IsConstant>
        </ReplaceVariableValue>
      </Statement>
    </ConditionalBlockType>
  </Statement>
</Statements>
```

As illustrated above, the output stream of the process 400 is an optimized generic XML stream. For example, the conditional block of "IF B=10 MOVE 10 TO C" is optimized to become "IF A=10 MOVE 10 TO C." As another example, the statement "MOVE A TO B" is marked as DeadStatement, because it does not have any impact within the input data stream and can be safely removed from the data stream without affecting the data stream. The process can also provide various functionalities in combination with other processes as described herein.

One example implementation of the process 400 is to provide automatic software system documentation. In one embodiment, the source code of legacy applications can be provided to the process 200 as input data stream to obtain a first-level classified stream, which includes refined source code with markings for program names, variables, entities, and constants. The first-level classification stream can be provided to the process 300 as input data stream to obtain a second-level classified stream, which includes extracted trace information and program flow information that is used to create a system overview. The second-level classified stream can be provided to the process 400 as input data stream to obtain a generic XML stream. This generic XML contains (1) information on linkages within the input data stream that leads to the documentation of a system overview and program linkages, (2) information on variables and entities in the data stream, such as their behavioral characteristics, and (3) information on logical blocks within the data stream. This information can be used to generate documentation for program logic, business rules, business processes and data model.

B. Components and Objects Generation Process

Figure 5:
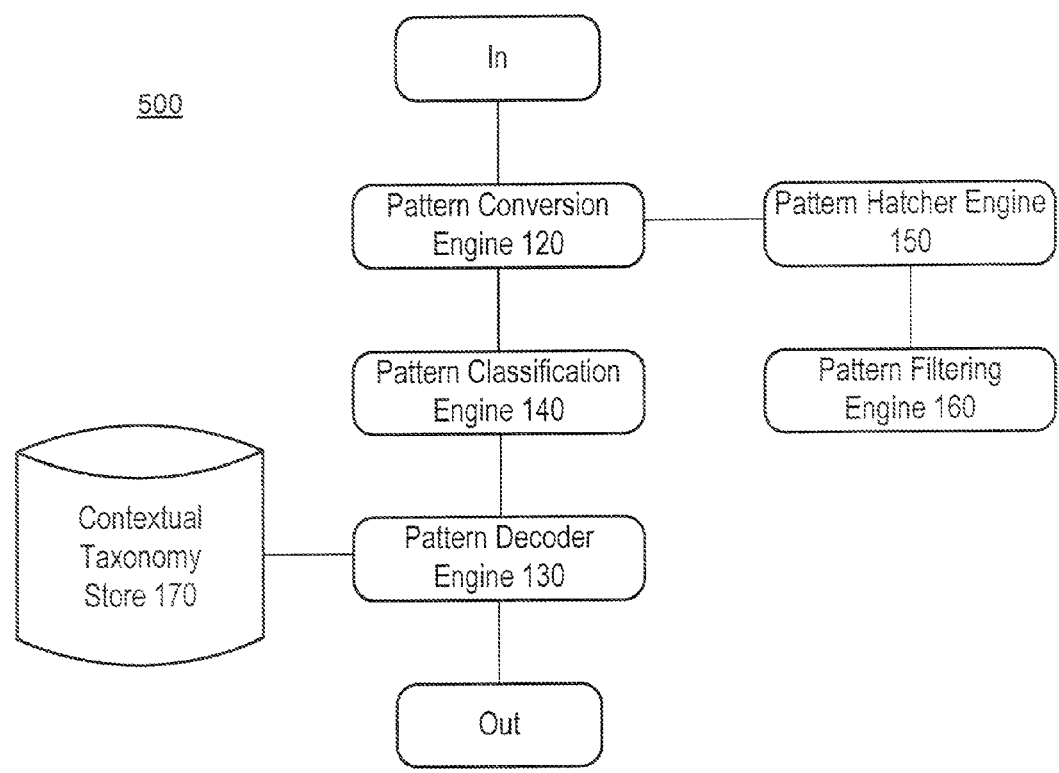
FIG. 5 is a flow diagram illustrating one embodiment of a process to derive XML components and objects from an input data stream in generic XML format using target attributes.

The flow diagram shown in FIG. 5 illustrates one embodiment of a process 500 to classify and group the output stream of the process 400, the standardized stream, into components and/or objects. A component contains the names of multiple logical blocks or business rules without their in-built logic. This logic is contained in objects that implement the functionality defined by components. In one embodiment, these components and objects are in XML. These components and objects may be modified based on target attributes specified externally.

The process 500 starts with the pattern conversion engine 120 marking the standardized stream based on similarity in behavior using predefined behavior patterns. If the standardized stream does not match any of the predefined behavior patterns, the pattern conversion engine 120 uses the pattern hatcher engine 150 and the pattern filtering engine 160 to obtain hatched behavior patterns similar to the scenario explained above with respect to FIG. 3. After marking the standardized stream using the hatched behavior patterns, the pattern conversion engine 120 passes the standardized stream to the pattern classification engine 140. The pattern classification engine 140 derives components and objects from logical blocks (e.g., business rules) based on the behavior pattern markings and target attribute specifications, and passes the standardized streams and the derived components and objects to the contextual pattern decoder engine 130. The target attribute specifications may specify how logical blocks are to be grouped together in the formation of components and/or objects.

The contextual pattern decoder engine 130 determines the connectivity among the derived components and objects using both the marked contextual information of the logical blocks in the components and objects and target attribute specifications, and stores the components, objects and their connectivity in the contextual taxonomy store segment 170. The contextual pattern decoder engine 130 outputs an input data stream in generic XML format along with the derived components and/or objects to the caller of the process 500.

Continuing with the input data stream example, the process 500 receives the output stream of the process 400 as input data stream, and generates an output data stream as illustrated below:

```
<ParentComponent>PROGRAM-A</ParentComponent>
<ChildComponent>PROGRAM-B</ChildComponent>
<Statements>
    <Statement>
```

-continued

```
<ConditionalBlockType>
    <ConditionalCheck>
        <Variable>A</Variable>
        <Operator>=</Operator>
        <Variable><IsConstant>10</IsConstant></Variable>
    </ConditionalCheck>
    <Statement>
        <ReplaceVariableValue>
            <PrimaryVariable>C</PrimaryVariable>
            <IsConstant>10</IsConstant>
        </ReplaceVariableValue>
    </Statement>
</ConditionalBlockType>
    </Statement>
</Statements>
```

As illustrated above, the output stream of the process 500 is a generic XML stream with derived components and/or objects. For example, the output stream identifies the parent and child components of the present component. As another example, the output stream includes an object having the optimized input data stream. The process can also provide various functionalities in combination with other processes as described herein.

One implementation of the process 500 is to provide automatic software system migration. As described above with respect to FIG. 4, a generic XML stream including software system documentation that includes a system overview, program logic, business rules and data model can be obtained based on the input application source code. The generic XML stream can be provided to the process 500 as input data stream. The intended target format can be specified in target attribute specifications. The process 500 generates transformed code in desired target platform language. In one embodiment, the transformed code is in object oriented language, and the objects in the transformed code corresponds with the components and objects derived by the process 500.

C. Security Analysis Process

Figure 6:
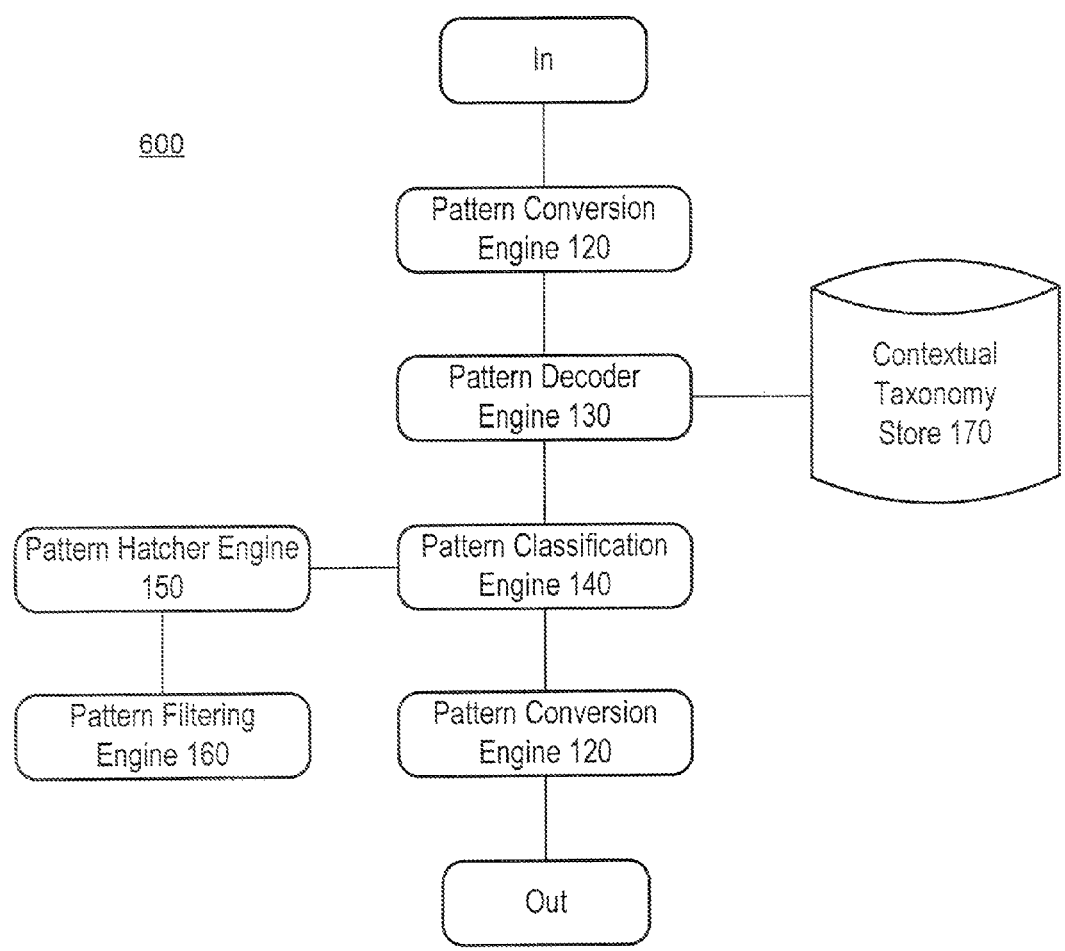
FIG. 6 is a flow diagram illustrating one embodiment of a process to classify, extract, and store knowledge elements relevant to specified domains for security analysis.

The flow diagram shown in FIG. 6 illustrates one embodiment of a process 600 to classify the second-level classified stream based on user defined rules, and to extract and store knowledge attributes using the contextual pattern decoder engine 130. These user defined rules, which dictates the specifications of the output data stream, are pre-populated in the contextual taxonomy store segment 170. The user defined rules may provide specifications at the detailed level such as variable specifications. Alternatively, the user defined rules may provide specifications at the broad-based level that is specific to domains like code transformation, security analysis or impact analysis.

The process 600 starts with the pattern conversion engine 120 passing the second-level classified stream to the contextual pattern decoder engine 130, which identifies contexts based on the user defined rules and stores the second-level classified stream along with the contextual markings in the contextual taxonomy store segment 170. The contextual pattern decoder engine 130 then passes the stream with the contextual markings to the pattern classification engine 140. The pattern classification engine 140 classifies the second-level classified stream based on user defined rules and predefined classification patterns. If a pattern with identified contexts does not match any of the predefined classification patterns, the pattern classification engine 140 uses the pattern hatcher engine 150 and the pattern filtering engine 160 to obtain hatched classification patterns similar to the scenario explained above with respect to FIG. 3. The pattern classification engine 140 classifies the stream using the hatched classification patterns and passes the stream to the pattern conversion engine 120. The pattern conversion engine 120 validates the classified second-level classified stream with contextual markings and outputs a data stream that has been identified and classified as per user defined rules to the caller of the process 600. The validation performed in this instance ensures that the classified second-level classified stream with contextual markings is consistent with the requirements specified in the user defined rules.

Continuing with the input data stream example, the process 600 receives the output stream of the process 500 as input data stream, processes the stream according to a user defined rule requiring the process 600 to retain control information for variable A only, and generates an output data stream as illustrated below:

```
<Statement>
  <ConditionalBlockType>
    <ConditionalCheck>
      <Variable>A</Variable>
      <Operator>=</Operator>
      <Variable><IsConstant>10</IsConstant></Variable>
    </ConditionalCheck>
    <Statement>
      <EffectsVariable>C<EffectsVariable>
    </Statement>
  </ConditionalBlockType>
</Statement>
```

As illustrated above, the output stream of the process 600 is a data stream that has been identified and classified as per the user defined rule requiring the process 600 to retain control information for variable A only. For example, the process 600 retains the block corresponding to the statement "IF A=10 MOVE 10 TO C." Because the conditional logic is related to A, both the conditional logic and the statement "MOVE 10 TO C," which depends on the result of the conditional logic, are related to variable A. Therefore, the process 600 outputs the data stream marking variable C as EffectsVariable. In addition, it is noted that the process 600 may provide various additional functionalities in combination with other processes as described in more detail herein.

D. Impact Analysis Process

Figure 7:
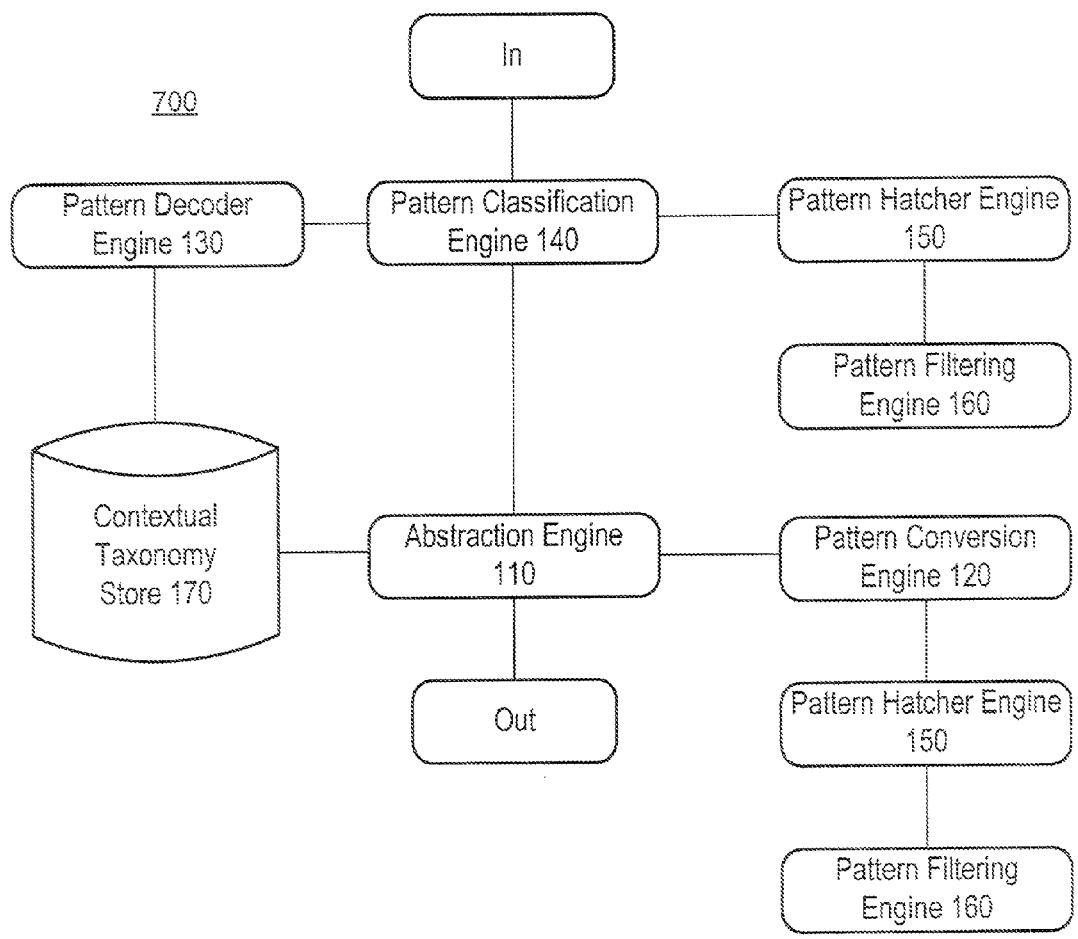
FIG. 7 is a flow diagram illustrating one embodiment of a process to perform comparative analysis of collected snapshots of input data stream.

The flow diagram shown in FIG. 7 illustrates one embodiment of a process 700 to compare an input data stream, which may or may not have been identified and classified as per user defined rules, with an earlier stored version of the same input data stream (e.g., snapshots). The process 700 results in a report that provides a comparative analysis of the input data stream that has been stored at different intervals.

The process 700 starts with the pattern classification engine 140 checking the input data stream for contextual markings based on user defined rules. If these markings do not exist, then the pattern classification engine 140 passes the input data stream to the contextual pattern decoder engine 130, which identifies the contexts based on the user defined rules. The pattern classification engine 140 marks the input data stream based on the contexts identified by the contextual pattern decoder engine 130 and the user defined rules. For this identification, the user defined rules are obtained from the contextual taxonomy store segment 170.

Further, the pattern classification engine 140 classifies the data stream using predefined classification patterns. During the classification process, the pattern classification engine 140 may filter out knowledge elements that are not required for comparison analysis based on the user defined rules. If a pattern with identified contexts does not match any of the predefined classification patterns, the pattern classification engine 140 uses the pattern hatcher engine 150 and the pattern filtering engine 160 to obtain hatched classification patterns similar to the scenario explained above with respect to FIG. 3. The pattern classification engine 140 classifies the data stream using the hatched classification patterns, and then passes the input data stream to the pattern abstraction engine 110.

The pattern abstraction engine 110 generates a standard representation of the input data stream (e.g., a generic XML representation) that has been identified and classified as per user defined rules. The pattern abstraction engine 110 obtains from the contextual taxonomy store segment 170 a snapshot of an input data stream along with user defined comparative analysis rules (e.g., user defined rules) and abstracts this snapshot into a standard representation using the rules that were used to abstract the input data stream. In one embodiment, the snapshots can be of the same input data stream or of two different data streams. The pattern abstraction engine 110 packages the two abstracted data streams (i.e., the standard representation of the two data streams) along with the user defined comparative analysis rules and passes them to the pattern conversion engine 120.

The pattern conversion engine 120 conducts comparative analysis by using the comparative rules to match predefined analysis patterns to the data streams in the package. If any part of one snapshot of the input data stream does not match any of the predefined analysis patterns, the pattern conversion engine 120 uses the pattern hatcher engine 150 and the pattern filtering engine 160 to obtain hatched analysis patterns similar to the scenario explained above with respect to FIG. 3. Once the predefined patterns and the snapshot of the input data stream have been matched, those same patterns are used to match with the other snapshot of the input data stream. Any discrepancies indicate the differences between the two snapshots of the input data stream. These discrepancies in the knowledge elements are sent by the pattern conversion engine 120 back to the pattern abstraction engine 110. The pattern abstraction engine 110 packages the results and outputs a data stream that contains results of the comparison between snapshots of the input data stream, based on user defined rules, to the caller of the process 700.

Continuing with the input data stream example, the process 700 receives the output stream of the process 600 as input data stream, process the stream according to a user defined comparative analysis rule requiring the process 700 to compare statements containing variable A with a previous snapshot of the input data stream. The following is a chart illustrating the input data stream (upper-left), the snapshot (upper-right) and the output stream of the process 700 (below).

```
<Statement>                          <Statement>
  <ConditionalBlockType>               <ConditionalBlockType>
    <ConditionalCheck>                   <ConditionalCheck>
      <Variable>A</Variable>               <Variable>A</Variable>
      <Operator>=</Operator>               <Operator>=</Operator>
      <Variable>                           <Variable>
        <IsConstant>10</IsConstant>          <IsConstant>20</IsConstant>
      </Variable>                          </Variable>
    </ConditionalCheck>                  </ConditionalCheck>
    <Statement>                          <Statement>
      <EffectsVariable>                    <EffectsVariable>
      C                                    C
      </EffectsVariable>                   </EffectsVariable>
    </Statement>                         </Statement>
```

-continued

```
    </ConditionalBlockType>            </ConditionalBlockType>
  </Statement>                         </Statement>
    <StatementChanged>
      <Statement>
        <ConditionalBlockType>
          <ConditionalCheck>
            <Variable>A</Variable>
            <Operator>=</Operator>
            <Variable><IsConstant>10</IsConstant></Variable>
          </ConditionalCheck>
          <Statement><EffectsVariable>C<EffectsVariable></Statement>
        </ConditionalBlockType>
      </Statement>
    </StatementChanged>
```

As illustrated above, the output stream of the process 700 is a data stream containing the comparison result of the input data stream and a snapshot of the same stream based on a user defined comparative analysis rule. For example, the output stream correctly identifies that the statements in the input data stream that relates to variable A and differs from the snapshot includes the portion of the input data stream corresponding to the conditional statement "IF A=10 MOVE 10 TO C."

One example implementation of the process 700 is to provide impact analysis—analyzing the impact of some modifications made to a software application. As described above with respect to FIG. 4, a second-level classified stream including extracted trace information and program flow information that is used to create a system overview stream can be obtained based on the source code of the software application. A second-level classified stream of the source code without the modifications can be generated and stored in the contextual taxonomy store segment 170 (e.g., the snapshot). Another second-level classified stream of the source code with the modifications can be generated and provided to the process 700 as input data stream. The process 700 compares the two input streams, and outputs a comparative report for the source code with and without modifications.

Another example implementation of the process 700 provides security analysis—analyzing the security impact of some modifications made to a software application. As described above with respect to FIG. 4, a second-level classified stream including extracted trace information and program flow information that is used to create a system overview stream can be obtained based on the source code of the software application. The second-level classification stream can be provided to the process 600 as input data stream to obtain a refined input code with information pertaining only to security analysis requirements. A refined stream of the source code without the modifications (e.g., the snapshot) can be generated and stored in the contextual taxonomy store segment 170. Another refined stream of the source code with the modifications can be generated and provided to the process 700 as input data stream. The process 700 compares the input stream snapshots with and without modifications, analyzes them and outputs an analysis report with regard to the security policy parameters in effect.

Still another example implementation of the process 700 provides security with code audit analysis—analyzing the security impact of source code modifications and keeping track of all approved changes for audit purposes. As described above with respect to FIG. 4, a software system documentation that includes a system overview, program logic, business rules and data model can be obtained based on the source code of the software application. The software system documentation can be provided to the process 600 as input data stream to obtain a refined input code with information pertaining only to security analysis requirements. A refined input code for the source code without the modifications can be generated and stored in the contextual taxonomy store segment 170 (e.g., the refined input code snapshot).

Also as described above with respect to FIG. 4, a second-level classified stream, which includes extracted trace information and program flow information that is used to create a system overview, can be obtained based on the source code of the software application. A second-level classified stream for the source code without the modifications can be generated and stored in the contextual taxonomy store segment 170 (e.g., the second-level classified stream snapshot). Another refined input code of the source code with the modifications and another second-level classified stream of the source code with the modifications can be generated and provided to the process 700 as input data streams.

The process 700 compares the input streams with and without modifications, analyzes them and generates an analysis output with regard to the security policy parameters in effect. During this process each snapshot of the input data stream is stored in the contextual taxonomy store segment 170 and compared with the previous snapshot using user defined rules that specify the parameters to be compared and changes to be allowed. A comparison report is generated with date and time information of the modifications, thereby creating an audit trail that lists the parameters in the modifications that do not satisfy allowable requirements or standards.

Example Embodiment for Pattern Abstraction Engine

Figure 8:
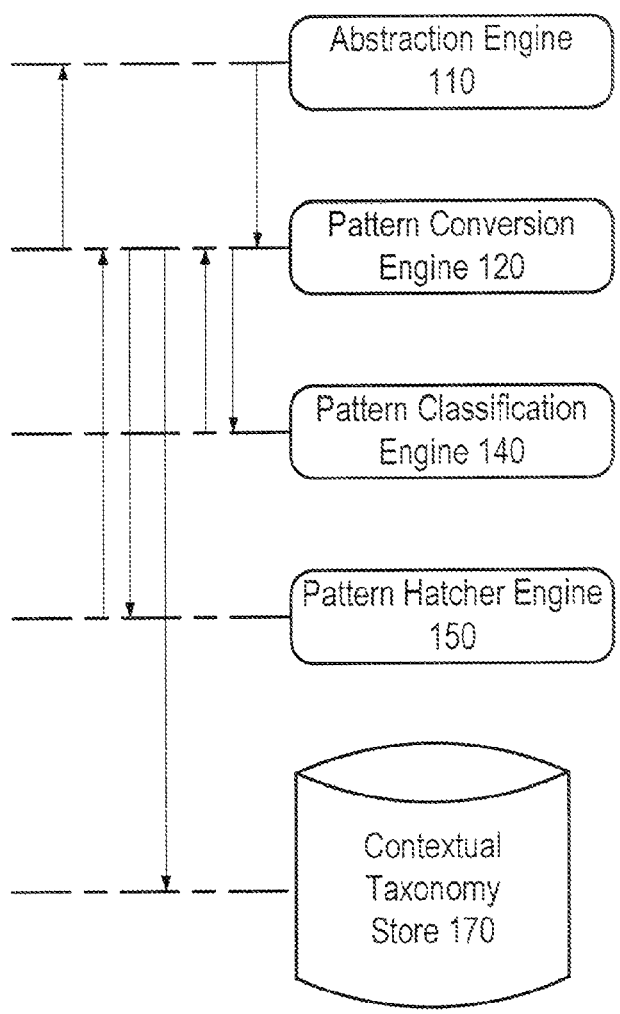
FIG. 8 is a sequence diagram illustrating one embodiment of an interaction of a pattern abstraction engine with other components.

As previously described, the pattern abstraction engine 110 is configured to generate a standard data stream of an input data stream and to generate an abstract representation for the standard data stream (also may be referenced as an abstracted data stream of the input data stream, or the input data stream in abstract format) using pattern matching and classification mechanisms. FIGS. 8 through 13 illustrate an example operation and implementation of the pattern abstraction engine 110. Referring now to FIG. 8, it illustrates one embodiment of an interaction of the pattern abstraction engine 110 with other components of the computing system 100.

In one embodiment, the pattern abstraction engine 110 retrieves an input data stream and formats it into a standard data stream by filtering the input data stream to remove unreadable characters. The pattern abstraction engine 110 then transmits the standard data stream to the pattern conversion engine 120. In one embodiment, the pattern conversion engine 120 uses the pattern classification engine 140 to derive (or identify) blocks from the standard data stream. The pattern classification engine 140 uses predefined block patterns to derive the blocks. The pattern classification engine 140 also identifies predefined classification patterns matching the standard data stream and classifies knowledge elements in the standard data stream using the classification patterns.

The pattern conversion engine 120 retrieves predefined abstraction patterns that match the blocks in the standard data stream from the contextual taxonomy store segment 170. If no matching abstraction pattern is found for a block, the pattern conversion engine 120 notifies the pattern hatcher engine 150. The pattern hatcher engine 150 identifies the master pattern related to the segment in the standard data stream for which no matching pattern was found and generates a matching abstraction pattern from that master pattern. The new abstraction pattern can be stored in the contextual taxonomy store segment 170 for future reference (e.g., comparison, operation, referencing, or as an input or output).

In one embodiment, the pattern conversion engine 120 uses dynamic rules and predefined abstraction patterns to transform the input data stream into its abstract format and returns the abstracted data stream to the pattern abstraction engine 110. The pattern abstraction engine 110 may then clean (e.g., remove unused variables) and optimize (e.g., change code structure) the abstracted data stream and return it to the calling component/process.

Figure 9:
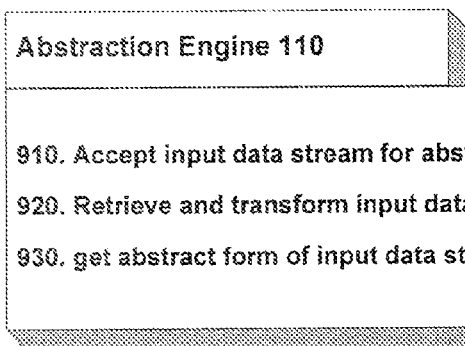
FIG. 9 is a schematic illustrating one embodiment of requisite processes which are part of developing a pattern abstraction engine.

FIG. 9 shows an embodiment of processes implemented in the pattern abstraction engine 110 to generate a standard data stream of an input data stream and to abstract the standard data stream into an abstracted data stream using pattern matching and classification mechanisms. In one or more embodiments, a process 910 accepts an input data stream that needs or is desired to be transformed into an abstracted data stream and to be placed as a global element so that it is available to other processes of the pattern abstraction engine 110. A process 920 retrieves an abstracted data stream from the pattern conversion engine 120 and places the abstracted data stream in a global component so that it is available to other processes of the pattern abstraction engine 110. A process 930 accesses the abstracted data stream in the global component and returns it to the calling component/process.

Figure 10:
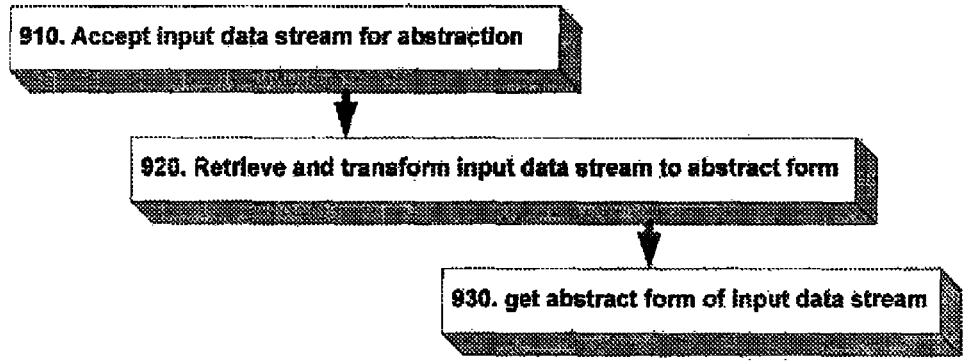
FIG. 10 is a schematic illustrating one embodiment of a typical process call sequence for a pattern abstraction engine.

FIG. 10 is a schematic illustrating one embodiment of a typical process call sequence for the pattern abstraction engine 110. An end result of the process call sequence is transforming an input data stream and representing it in an abstract format. As illustrated in the flow scheme, a calling component/process calls the process 910 and passes in the input data stream for abstraction. The process 920 is called to break up the input data stream into blocks, to classify the blocks, and to transform the input data stream into its abstract format using the pattern conversion engine 120, the pattern classification engine 140, the pattern hatcher engine 150 and the contextual taxonomy store segment 170. Finally, the process 930 is called to return the abstracted data stream to the calling component/process.

Figure 11:
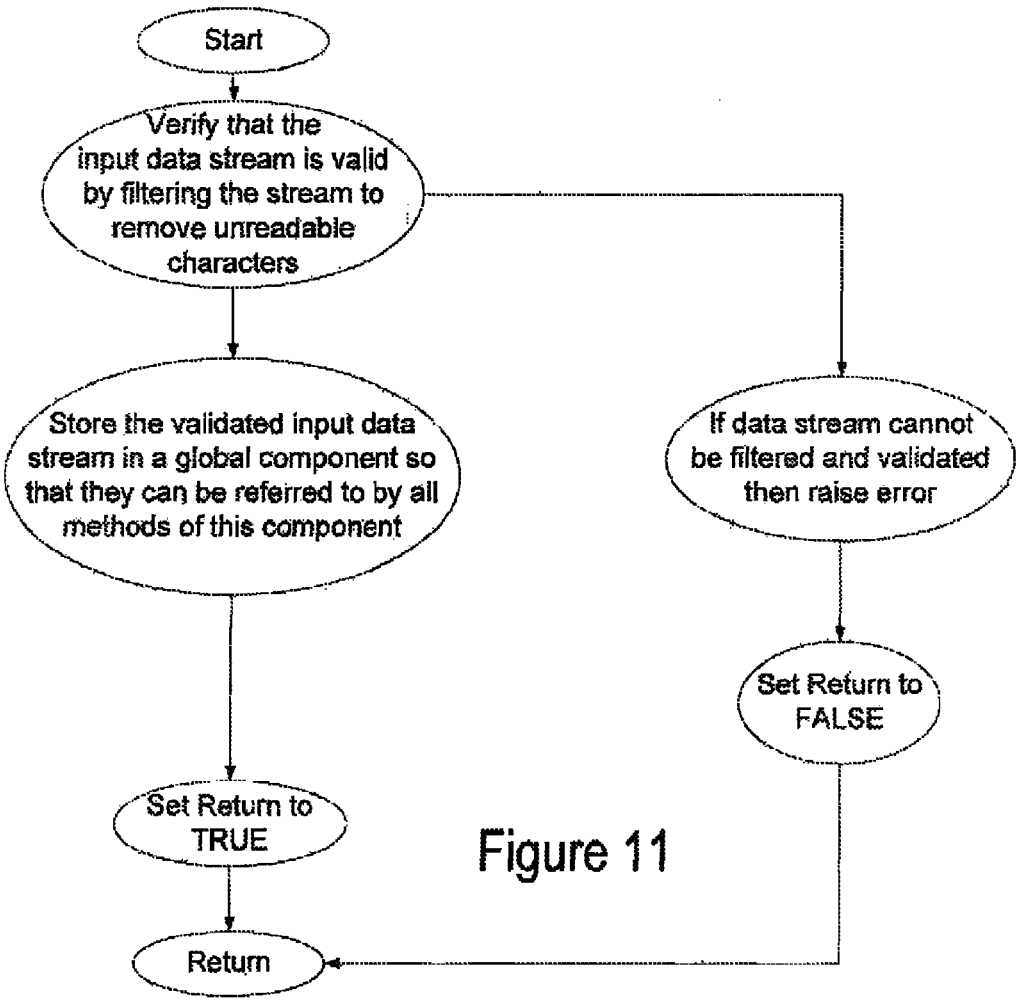
FIG. 11 is a flow for one embodiment of a process for an accept input data stream for abstraction process of a pattern abstraction engine.

FIG. 11 is a flowchart illustrating one embodiment for the process 910 of the pattern abstraction engine 110. The process 910 accepts the input data stream from the calling component/process and validates it by filtering the input data stream to remove any unreadable characters. If the input data stream cannot be filtered, the process 910 raises an error and returns a value of FALSE (or e.g., logic low) to the calling component/process. After successful validation, the process 910 stores the verified input data stream in a global component so that it is made available to other processes of the pattern abstraction engine 110. Thereafter, the process 910 returns a value of TRUE (or e.g., logic high) to the calling component/process.

Figure 12:
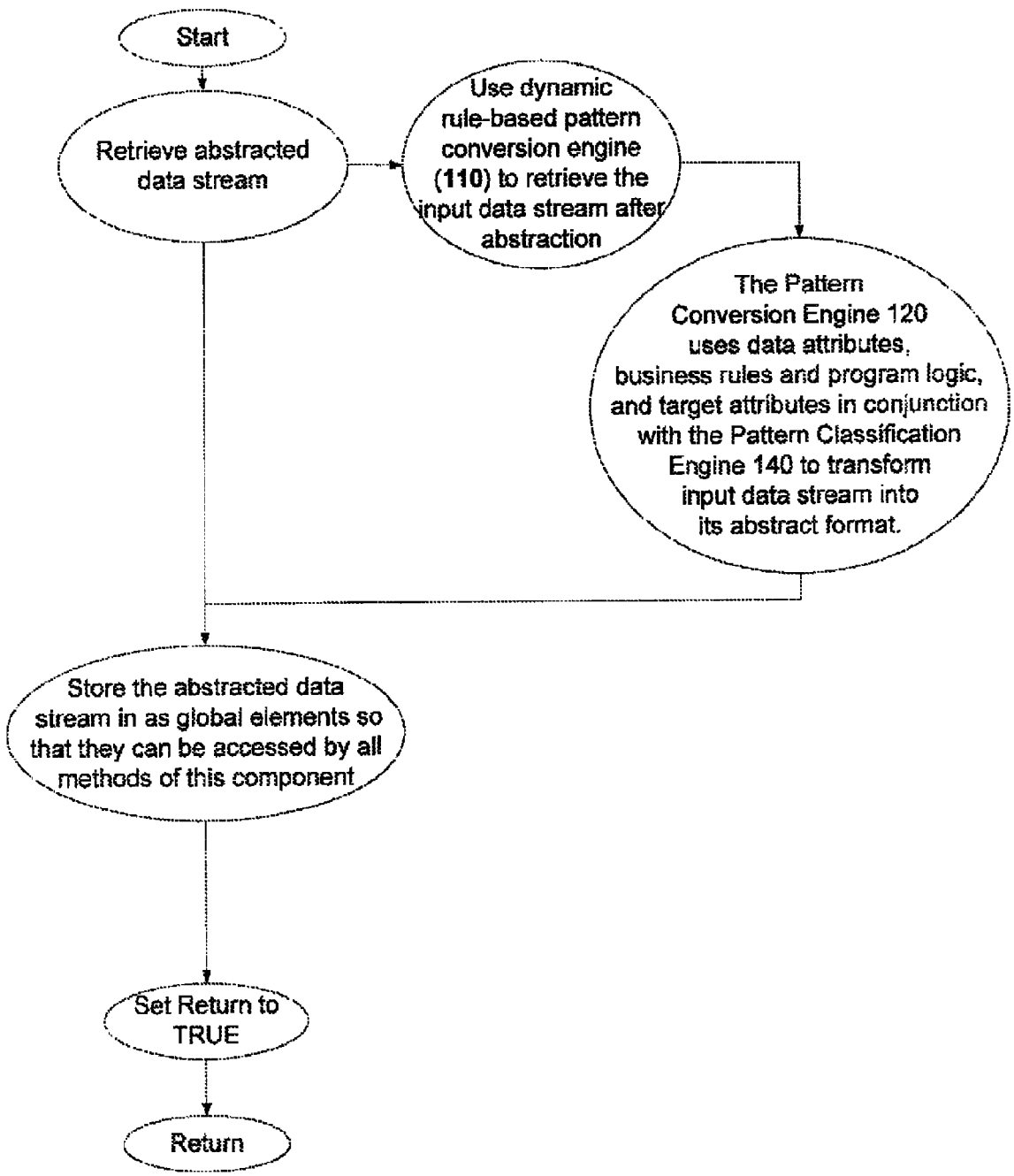
FIG. 12 is a flow for one embodiment of a process for a retrieve and transform input data stream process of a pattern abstraction engine.

FIG. 12 is a flowchart illustrating one embodiment for the process 920 of the pattern abstraction engine 110. The process 920 uses the pattern conversion engine 120 to retrieve the abstracted data stream of the input data stream. The pattern conversion engine 120 uses knowledge elements, blocks and target attributes from the contextual taxonomy store segment 170, the pattern classification engine 140, the pattern hatcher engine 150, and pattern matching and classification mechanisms to transform the input data stream into the abstracted data stream. The process 920 then stores the abstracted data stream in a global component so that it is made available to other processes of the pattern abstraction engine 110. Thereafter, the process 920 returns a value of TRUE to the calling component/process.

Figure 13:
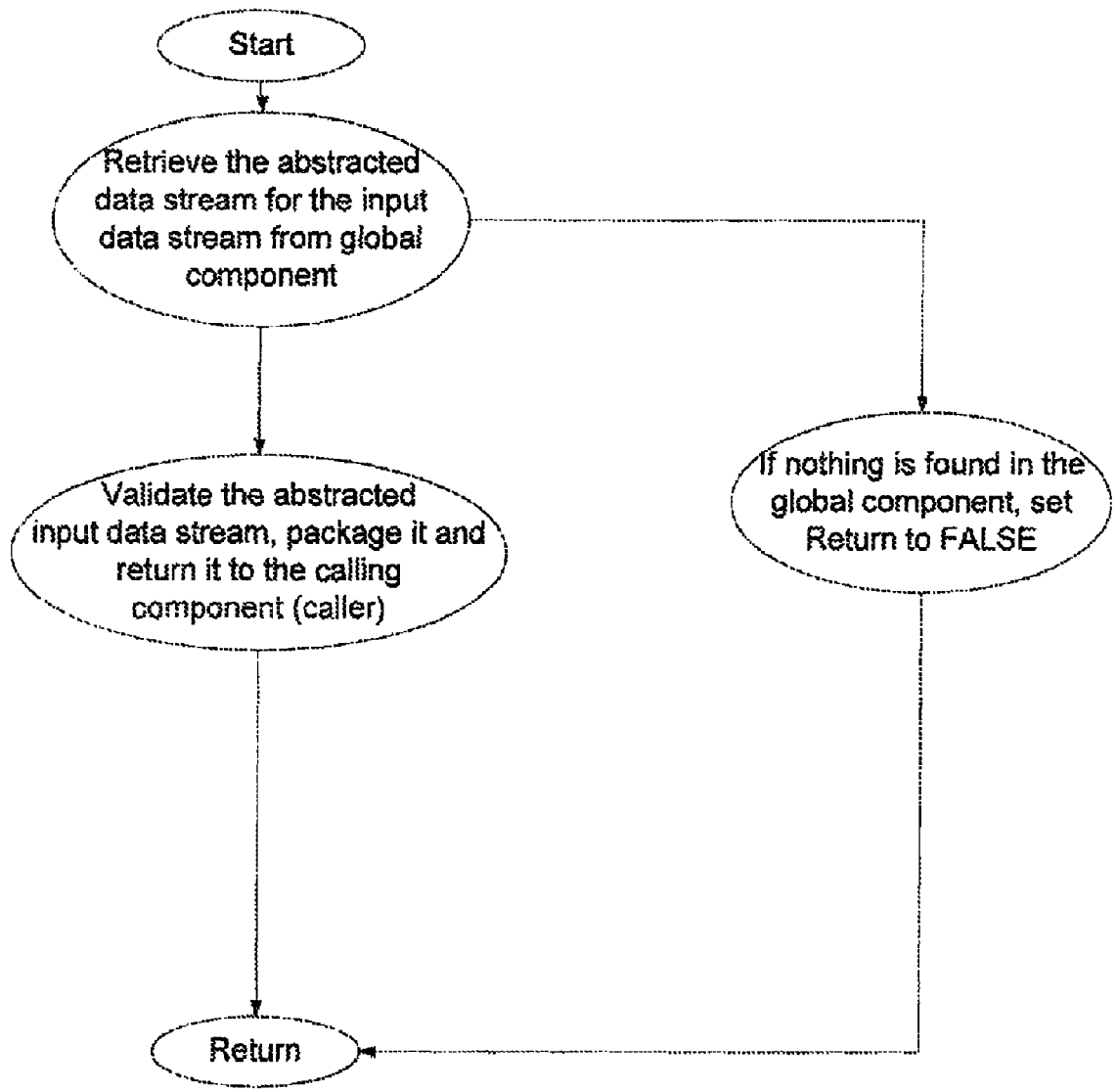
FIG. 13 is a flow for one embodiment of a process for a get abstract form of input data stream process of a pattern abstraction engine.

FIG. 13 is a flowchart illustrating one embodiment for the process 930 of the pattern abstraction engine 110. The process 930 retrieves the abstracted data stream of the input data stream from the global component and returns it to the calling component/process. The process 930 first checks the global component to check its existence. If no abstracted data stream exists in the global component, the process 930 returns a value of FALSE to the calling component/process. Otherwise, the process 930 validates and packages the abstracted data stream and returns it to the calling component/process.

Thus, in one embodiment the pattern abstraction engine 110 is configured to generate a standard data stream of an input data stream and to abstract the standard data stream into an abstracted data stream using pattern matching and classification mechanisms. The embodiments disclosed advantageously provide a method for abstracting an input data stream into a format that may be optimal and efficient for processing of various input data types, and an ability to dynamically intercept, package, and transform an input data stream into an abstract representation. Comparing to the input data stream, the abstract representation can be more readily deciphered and transformed by way of this automation.

Example Embodiment for Contextual Pattern Decoder Engine

Figure 14:
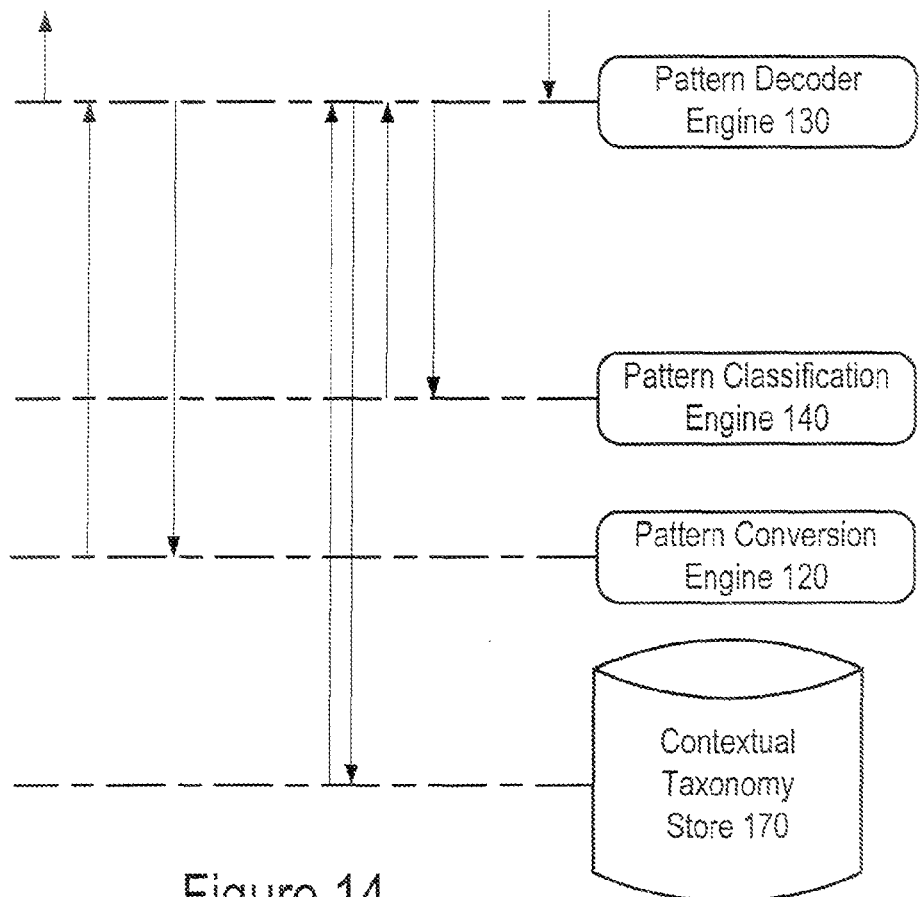
FIG. 14 is a sequence diagram illustrating one embodiment of an interaction of a contextual pattern decoder engine with other components.

As previously described, the contextual pattern decoder engine 130 is configured to extract (or derive) knowledge and contextual attributes from the input data stream. FIGS. 14 through 21 illustrate an example operation and implementation of the contextual pattern decoder engine 130. Referring now to FIG. 14, it illustrates one embodiment of an interaction of the contextual pattern decoder engine 130 with other components of the computing system 100.

In one embodiment, the contextual pattern decoder engine 130 retrieves an input data stream and identifies predefined decoding patterns matching the input data stream. The contextual pattern decoder engine 130 passes the input data stream and the matching predefined decoding patterns to the pattern classification engine 140. The pattern classification engine 140 performs second level classification on knowledge elements in the input data stream to classify the knowledge elements into data entities, variables and logical blocks (or business rules) using the predefined decoding patterns.

The contextual pattern decoder engine 130 uses target attribute specification information (also may be referenced as target attributes, target attribute specification) to discover and mark knowledge attributes (including taxonomy and context information) that is specific to the desired target architecture. To perform the discovery, the contextual pattern decoder engine 130 uses dynamic rules to derive data entity and data variable life cycles throughout the input data stream. These dynamic rules are constructed at runtime from a master dynamic rule. The master rule that is chosen for modification will depend on the functionality to be performed. An example of a master dynamic rule that will trace a variable/entities lifecycle through an input data stream is as follows:

```
<Rule>
  <RuleSet>
    <UseIF>Input uses JCL</UseIF>
    <VariableTrace>
    Begin from JCL and relate to Proc
    </VariableTrace>
  </RuleSet>
  <RuleSet>
    <UseIF>Input uses COBOL</UseIF>
    <VariableTrace>Constitute in statements</VariableTrace>
    <StatementTypes>
      <Type>
        <Operation>MOVE</Operation>
        <Effects>Changes Value</Effects>
      </Type>
    </StatementTypes>
```

-continued

```
    </RuleSet>
</Rule>
```

Based on the type of input data stream the master rule will be modified to include or exclude RuleSet sections (the section labeled <RuleSet> and </RuleSet>) of the master rule. For example, if the input data stream is in Job Control Language (JCL), the first RuleSet section will be included in the master dynamic rule. Alternatively, if the input data stream is in COBOL, the second RuleSet section will be included in the master dynamic rule.

The contextual pattern decoder engine 130 discovers knowledge attributes with related taxonomy and contextual information, which includes (1) the knowledge attributes pertaining to data entities and their life cycle, and (2) the knowledge attributes pertaining to business rules (or logical blocks) and variables and their life cycle trace information. Additionally, the contextual pattern decoder engine 130 also derives and stores the contextual taxonomy for the business rules in the contextual taxonomy store segment 170. The pattern conversion engine 120 transforms the input data stream into desired target data using the target attributes, knowledge attributes and contextual taxonomy discovered by the contextual pattern decoder engine 130.

Figure 15:
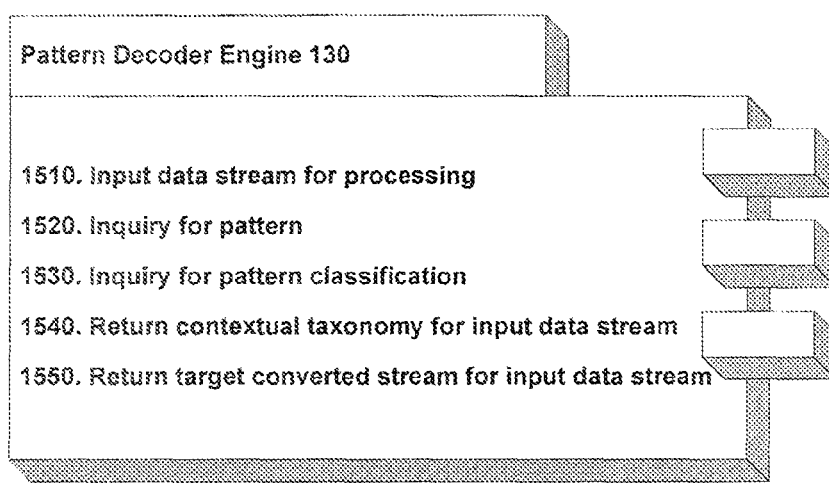
FIG. 15 is a schematic illustrating one embodiment of requisite processes which are part of developing a contextual pattern decoder engine.

FIG. 15 shows an embodiment of processes implemented in the contextual pattern decoder engine 130 to extract (or derive) knowledge and contextual attributes from an input data stream. In one or more embodiments, a process 1510 accepts an input data stream. A process 1520 retrieves predefined decoding patterns that match the input data stream. A process 1530 derives classified block pattern information for the input data stream. A process 1540 obtains (e.g., receives or requests) contextual taxonomy information for the input data stream. Further, the process 1540 also performs data entity and data variable life cycle trace exercise, and marks the input data stream with the extracted knowledge elements. A process 1550 transforms the input data stream to a desired target format utilizing derived contextual taxonomy and knowledge element markings in the input data stream.

Figure 16:
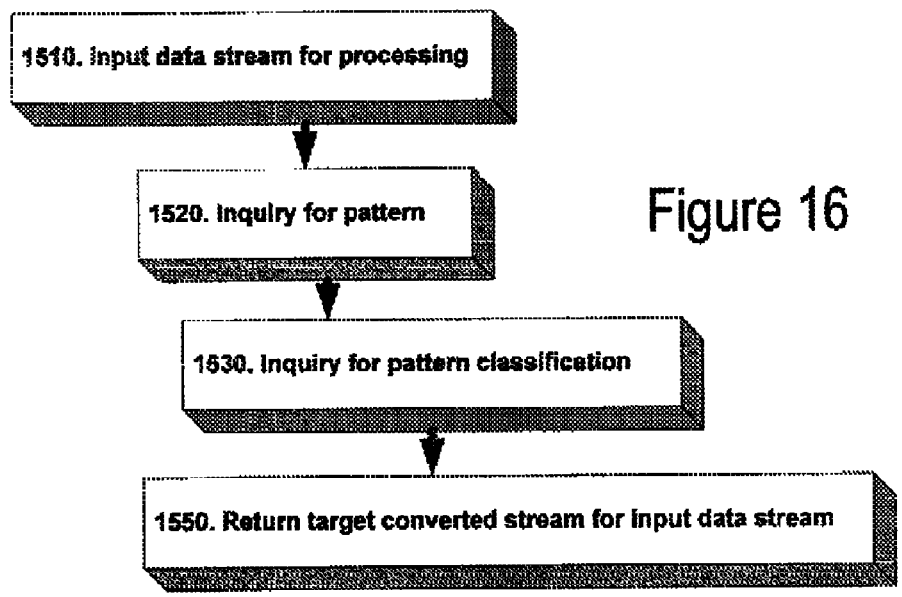
FIG. 16 is a schematic illustrating one embodiment of a typical process call sequence for a contextual pattern decoder engine.

FIG. 16 is a schematic illustrating one embodiment of a typical process call sequence for the contextual pattern decoder engine 130. As illustrated in the flow scheme, a calling component/process calls the process 1510 and provides (e.g., transmits or otherwise makes available) the input data stream to the contextual pattern decoder engine 130. The process 1520 is called to retrieve predefined decoding patterns for the input data stream. The process 1530 is called to derive the classified block patterns for the input data stream using pattern classification engine 140. Next, the process 1550 is called (e.g., instructed or notified), which extracts the contextual taxonomy and knowledge element (e.g., variable) life cycle information.

Figure 17:
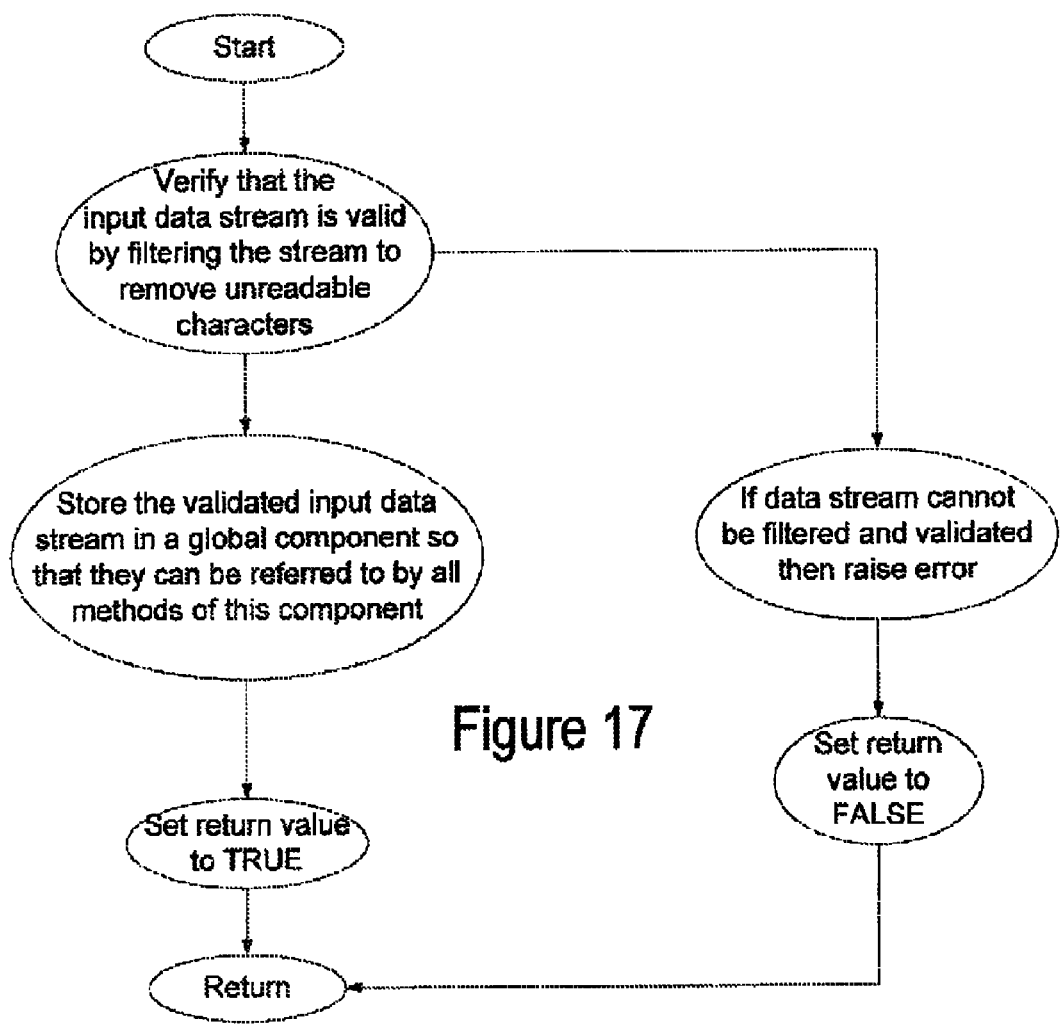
FIG. 17 is a flow for one embodiment of a process for an input data stream for processing process of a contextual pattern decoder engine.

FIG. 17 is a flowchart illustrating one embodiment for the process 1510 of the contextual pattern decoder engine 130. The process 1510 verifies that the input data stream is valid by attempting to filter the input data stream to remove unreadable characters. If the input data stream cannot be filtered, then the process 1510 raises an error and returns a value of FALSE to the calling component/process. Otherwise, the process 1510 stores the verified input data stream in a global component so that it is available to other processes of the contextual pattern decoder engine 130, and returns a value of TRUE to the calling component/process.

Figure 18:
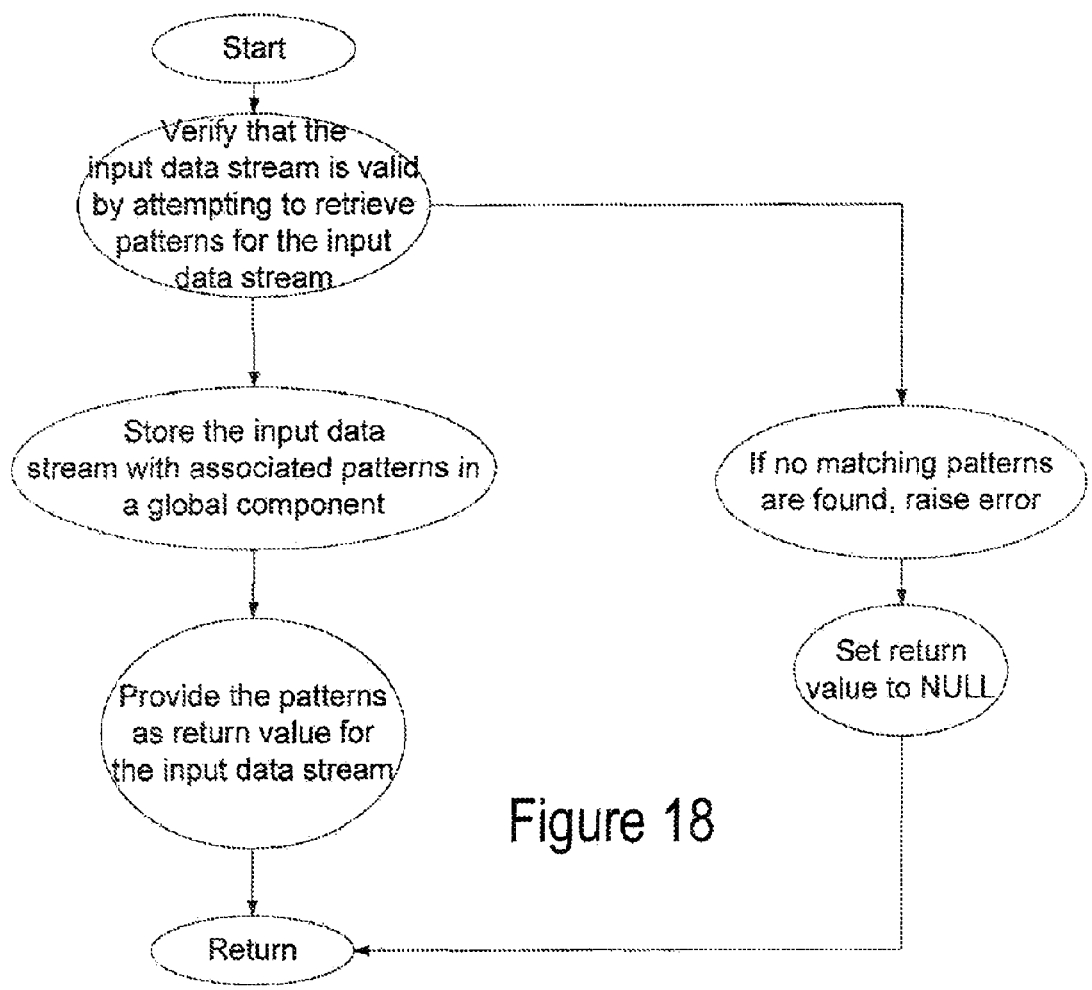
FIG. 18 is a flow for one embodiment of a process for an inquiry for pattern process of a contextual pattern decoder engine.

FIG. 18 is a flowchart illustrating one embodiment for the process 1520 of the contextual pattern decoder engine 130. The process 1520 verifies that that the input data stream passed to this process is valid by attempting to retrieve primary patterns matching the input data stream. Primary patterns are patterns that could be used to decipher the input data stream and perform extraction of information. If no matching primary pattern is found, then the process 1520 raises an error and returns a value of NULL to the calling component/process. Otherwise, the process 1520 stores the input data stream with the matching primary patterns (e.g., associated primary patterns) in a global component so that they are available to other processes of the contextual pattern decoder engine 130. The process 1520 returns the primary patterns to the calling component/process.

Figure 19:
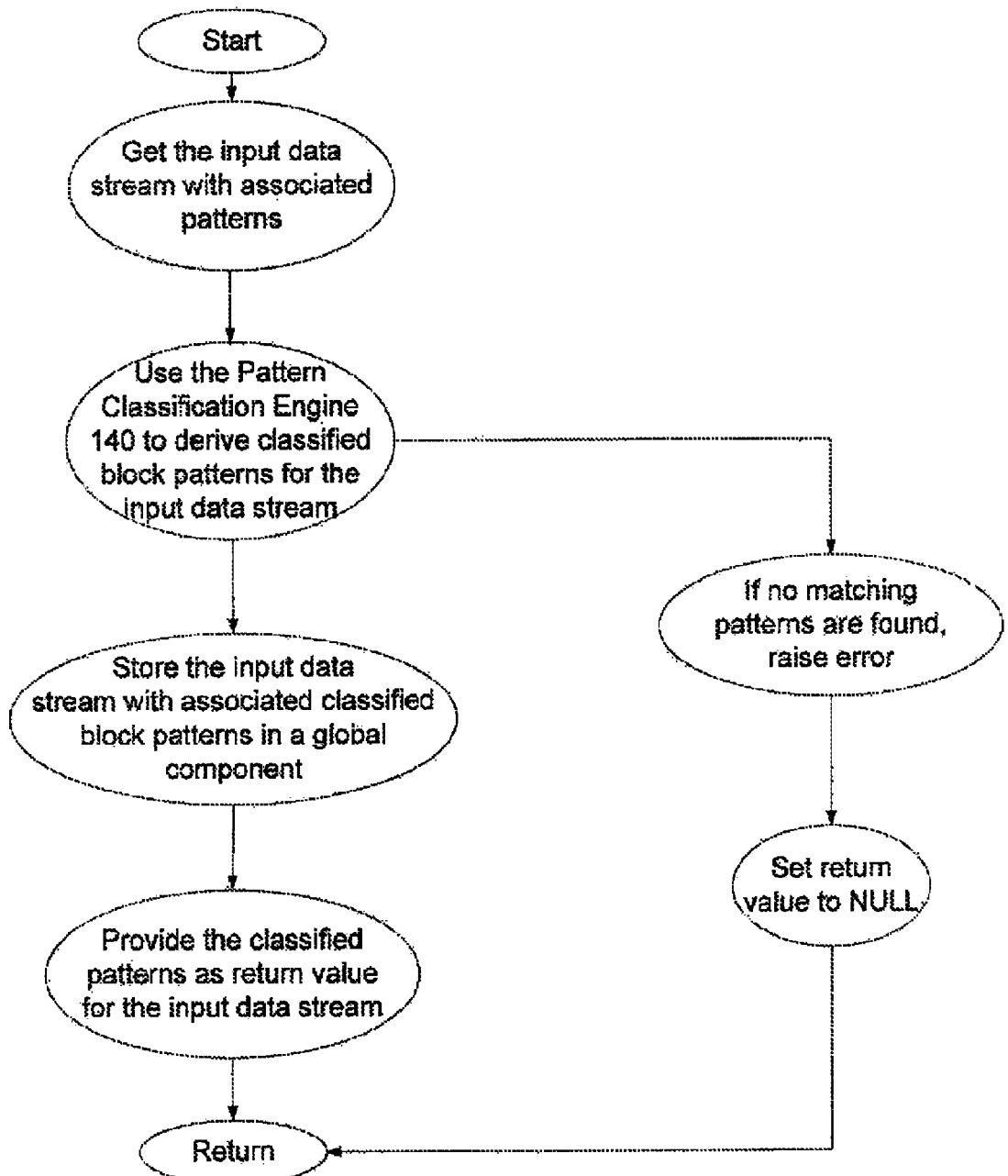
FIG. 19 is a flow for one embodiment of a process for an inquiry for pattern classification process of a contextual pattern decoder engine.

FIG. 19 is a flowchart illustrating one embodiment for the process 1530 of the contextual pattern decoder engine 130. The process 1530 processes the input data stream and its associated primary patterns to extract classified blocks from the input data stream. The process 1530 first uses the pattern classification engine 140 to derive classified block patterns matching the input data stream. Classified block patterns are patterns that map to hidden business rule information in the input data stream and facilitate subsequent extraction of knowledge elements from the input data stream. If the pattern classification engine 140 does not find any matching block pattern, then the process 1530 raises an error and returns a value of NULL to the calling component/process. Otherwise, the process 1530 stores the input data stream and the matching classified block patterns in a global component so that they are available to other processes of the contextual pattern decoder engine 130. The process 1530 then returns the classified block patterns to the calling component/process.

Figure 20:
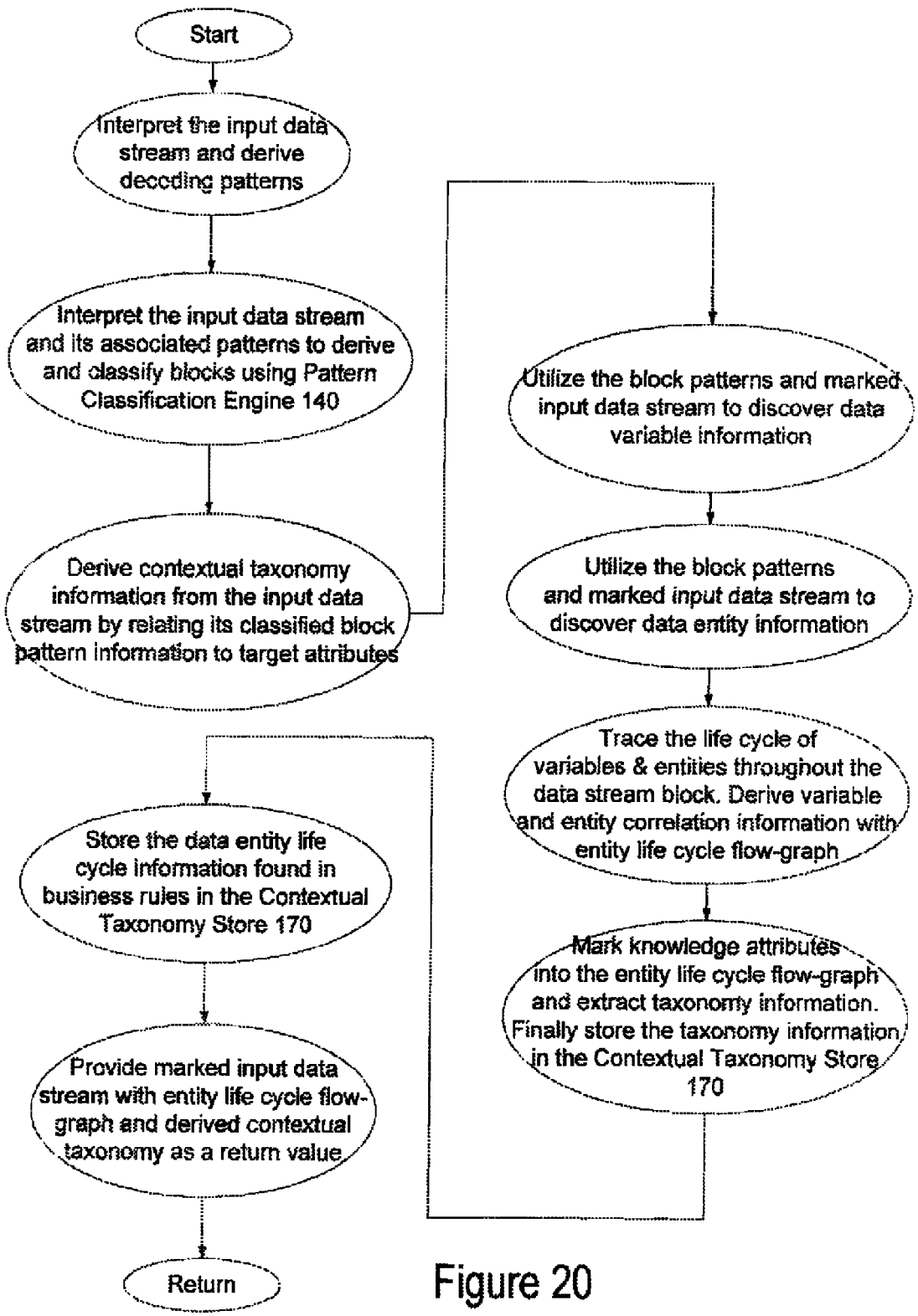
FIG. 20 is a flow for one embodiment of a process for a return contextual taxonomy for input data stream process of a contextual pattern decoder engine.

FIG. 20 is a flowchart illustrating one embodiment for the process 1540 of the contextual pattern decoder engine 130. The process 1540 first retrieves decoding patterns matching the input data stream. Decoding patterns are patterns used to decode individual statements from the input data stream. An example of a decoding pattern that decodes variables in an IF condition is "IF *~*." In the decoding pattern, "IF" is the keyword in an IF condition statement, "*" represents a variable, and "~" represents a relationship, such as "=;" "<" or ">."

Next the process 1540 further processes the input data stream and its associated patterns (e.g., primary patterns, decoding patterns and classified block patterns) to derive and classify blocks in the input data stream. In one embodiment, the process 1540, similar to the process 1530, uses the pattern classification engine 140 to derive and classify blocks in the input data stream.

The process 1540 uses the classified blocks and target attributes to derive the contextual taxonomy information. The target attributes include target transformation criteria and associated transformation patterns. The process 1540 derives (e.g., extracts and marks) variable information such as the variables occurring in the classified blocks of the input data stream. The process 1540 also derives (or discovers) entity information such as data entities occurring in the classified blocks of the input data stream. The process 1540 traces the life cycles of variables and/or data entities in the input data stream and creates a life cycle flow graph for them.

A life cycle flow graph identifies how the value of a variable or a data entity changes within the input data stream due to the actions performed by each statement in the input data stream. The process 1540 uses the life cycle flow graphs to mark and map the knowledge elements and their associated action statements in the input data stream and to extract taxonomy information. The taxonomy information includes information such as names of variables that participate in action statements. The process 1540 derives the association of the variables and/or data entities with action statements and derives contextual information and packages the taxonomy and contextual information for the input data stream.

The process 1540 stores the life cycle information for the data entities and variables derived from the input data stream, and returns the input data stream and its associated life cycle and contextual taxonomy information to the calling component/process. The associated life cycle and contextual taxonomy information includes the life cycle information for the variables and/or data entities, and contextual taxonomy information.

Figure 21:
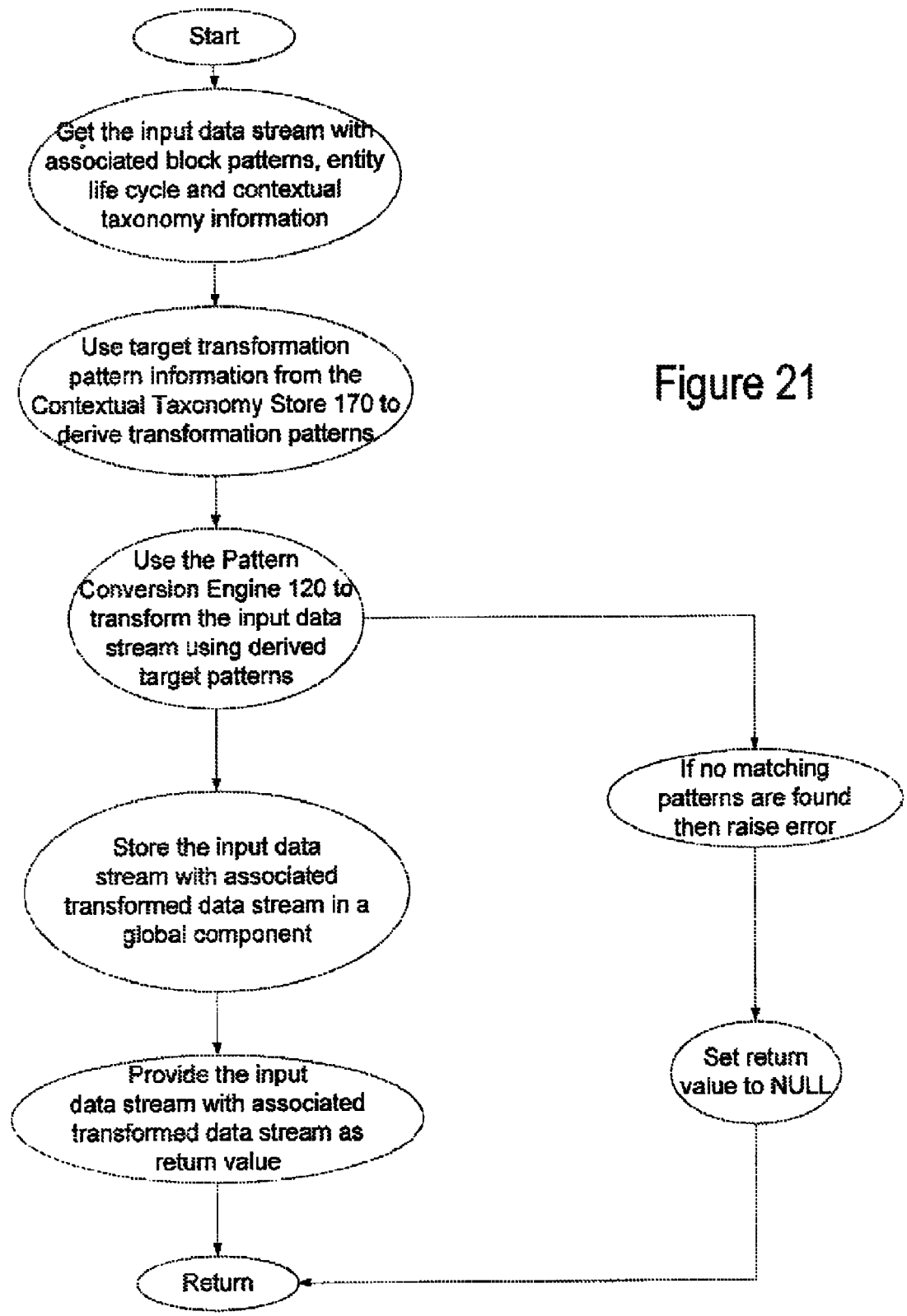
FIG. 21 is a flow for one embodiment of a process for a return target converted stream for input data stream process of a contextual pattern decoder engine.

FIG. 21 is a flowchart illustrating one embodiment for the process 1550 of the contextual pattern decoder engine 130. The process 1550 uses the target attributes to transform the input data stream and its associated life cycle and contextual taxonomy information. In one embodiment, the process 1550 retrieves the classified block patterns, the life cycle flow graphs, and contextual taxonomy information associated with the input data stream. The process 1550 uses the pattern conversion engine 120 to identify matching transformation patterns and to transform the input data stream as dictated by the matching transformation patterns and associated target transformation criteria in the target attributes. If no matching transformation patterns are found, the process 1550 raises an error and returns a value of NULL to the calling component/process.

The process 1550 stores the input data stream with the transformed data stream in a global component so that it is available to other processes of the contextual pattern decoder engine 130. The process 1550 returns the input data stream and the transformed data stream to the calling component/process.

Thus, in one embodiment the contextual pattern decoder engine 130 is configured to detect and classify knowledge elements and/or contexts pertaining to and forming taxonomy for an input data stream. In one embodiment, taxonomy describes the relationship of the variables/entities to their knowledge elements and the relationship of the knowledge elements to the contexts. The relationships described in the taxonomy may facilitate the transformation of the input data stream into a desired target format. The contextual pattern decoder engine 130 passes taxonomy and related contextual attributes (or contexts) that are derived to the pattern conversion engine 120. The pattern conversion engine 120 transforms the input data stream using the taxonomy and related contextual attributes. The contextual pattern decoder engine 130 derives the knowledge elements based on the context information. The contextual pattern decoder engine 130 extracts variables/entities from the derived knowledge elements.

The embodiments disclosed advantageously provide an ability to decipher and/or interpret keywords and to associate them as taxonomy for the input data stream. By deriving contextual information for the taxonomy keywords using life cycle trace methodology, abstract knowledge is derived from the input data stream. In addition, by utilizing dynamic rules to decide what and how to interpret the input data stream; the present disclosure increases the adaptability of the solution. Thus, the embodiments disclosed create value from an ability to interpret the input data stream so as to derive abstract knowledge.

Example Process for Software System Documentation And Migration

The principles described herein can be further illustrated through an example of an operation of the computing system 100 that generates a documentation of a software application written in any language covering a system overview, its program logic and embedded business rules and data model. The components operational within the computing system 100 in one embodiment is also configured to convert the software application from any source language to any target language. In this example, a software application was written in COBOL, and the desired output is a collection of source code in JAVA equivalent to the COBOL code and a documentation of the software application.

Figure 22:
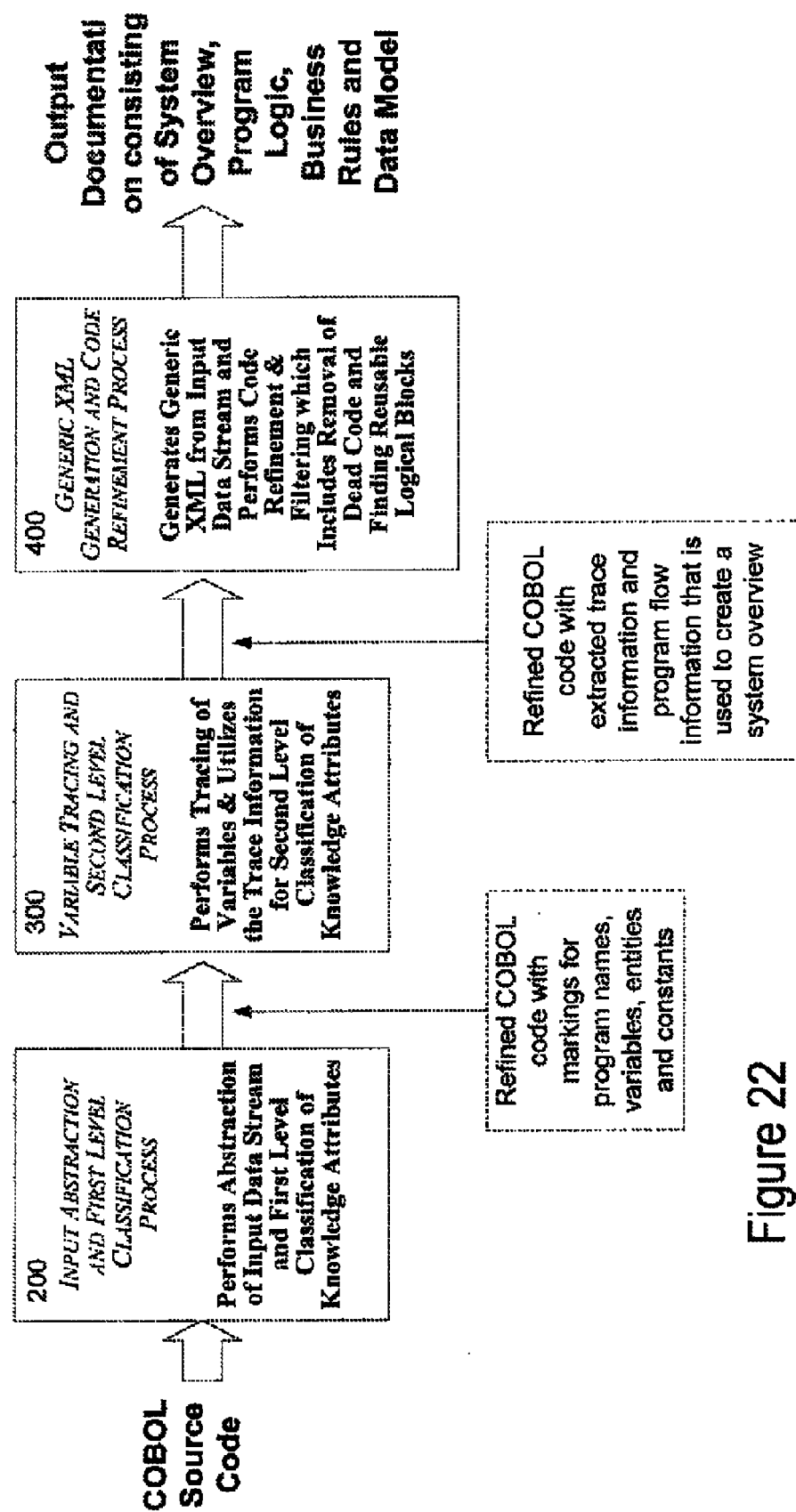
FIG. 22 is a flow diagram illustrating one embodiment of a process to generate software system documentation.

FIG. 22 is a flow chart illustrating a process for the computing system 100 to generate documentation for the COBOL source code. The documentation includes information system overview, program logic, business rules, and data model about the COBOL source code. The computing system 100 accepts the COBOL source code as input data stream and processes it using the input abstraction and first level classification process 200, which is described above in detail with reference to FIG. 2. The process 200 outputs refined COBOL code with markings for program names, variables, entities and constants. This refined COBOL code can be provided as input to the variable tracing and second level classification process 300, which is described above in detail with reference to FIG. 3. The process 300 outputs refined COBOL code with extracted trace information and program flow information that is used to create a system overview. The output of process 300 can be provided as input to the generic XML generation and code refinement process 400, which is described above in detail with reference to FIG. 4. The process 400 outputs documentation that includes a system overview, program logic, business rules and data model. Note that, as described previously (e.g., with respect to FIG. 3), the output can be displayed in one or more different formats (e.g., graphically as a flow, pseudo code, and/or text) based on user preferences or predefined system configurations.

Figure 23:
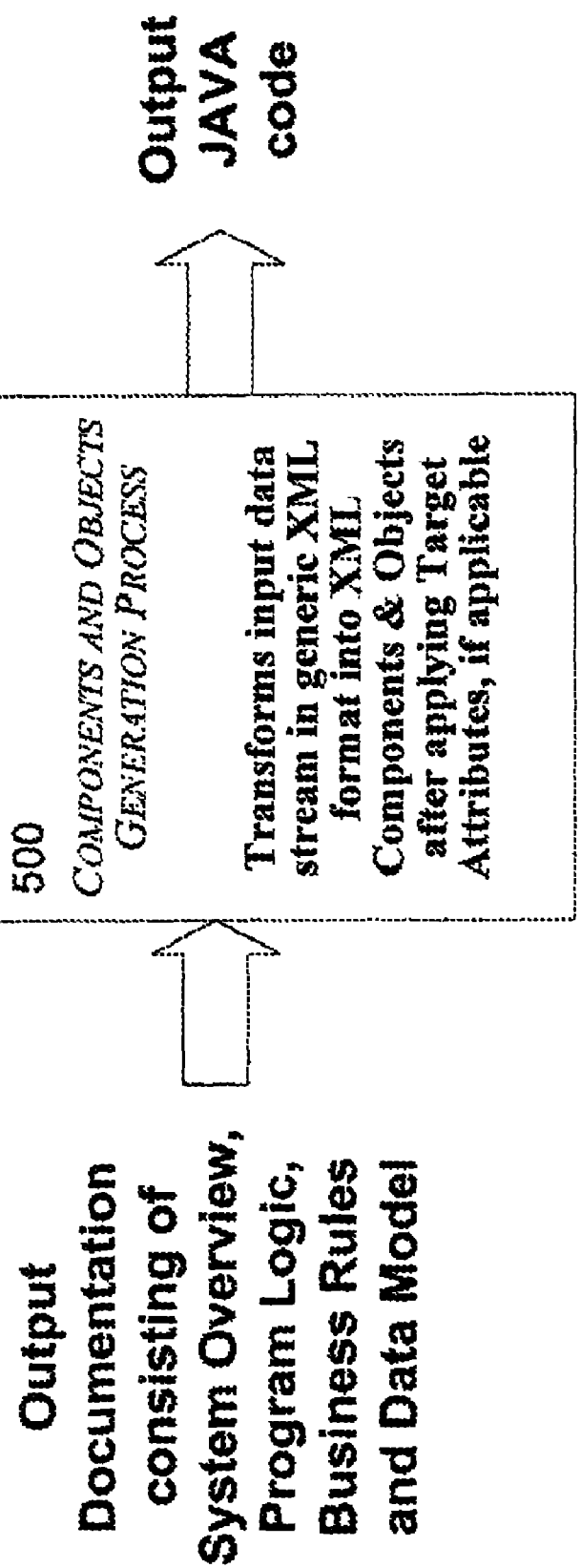
FIG. 23 is a flow diagram illustrating one embodiment of a process to conduct software system migration.

FIG. 23 is a flow chart illustrating a process for the computing system 100 to convert the COBOL source code into JAVA source code. The flow chart in FIG. 23 is a continuation of the flow chart in FIG. 22. As described above, the process outputs documentation includes a system overview, program logic, business rules and data model. This documentation can be provided as input to the component and objects generation process 500, which is described above in detail with reference to FIG. 5. The process 500 outputs transformed code in JAVA.

Thus, the computing system 100 can selectively execute some of the processes described above with respect to FIGS. 2-5 and generate documentation and transformed source code for a software application written in any language. The transformed software code in a destination language (JAVA) provides substantially the same functionality as the software in the source language (COBOL). It is noted that in one embodiment, 75%-85% of the transformation process is automatic and processed by the computing system 100, and 15%-25% of the process is conducted manually (e.g., due to the original code or logic being unclear as to processing paths to take) with the help of the generated documentation. In some embodiments, the documentation generation and the transformation process can be close to or up to 100% automated with little or no manual intervention.

Example Process for Impact Analysis, Security Analysis, and Security With Code Audit Analysis The principles described herein can be further illustrated through an example of an operation of the computing system 100 that conducts impact analysis, security analysis, and security with code audit analysis of modifications made to a software application.

Figure 24:
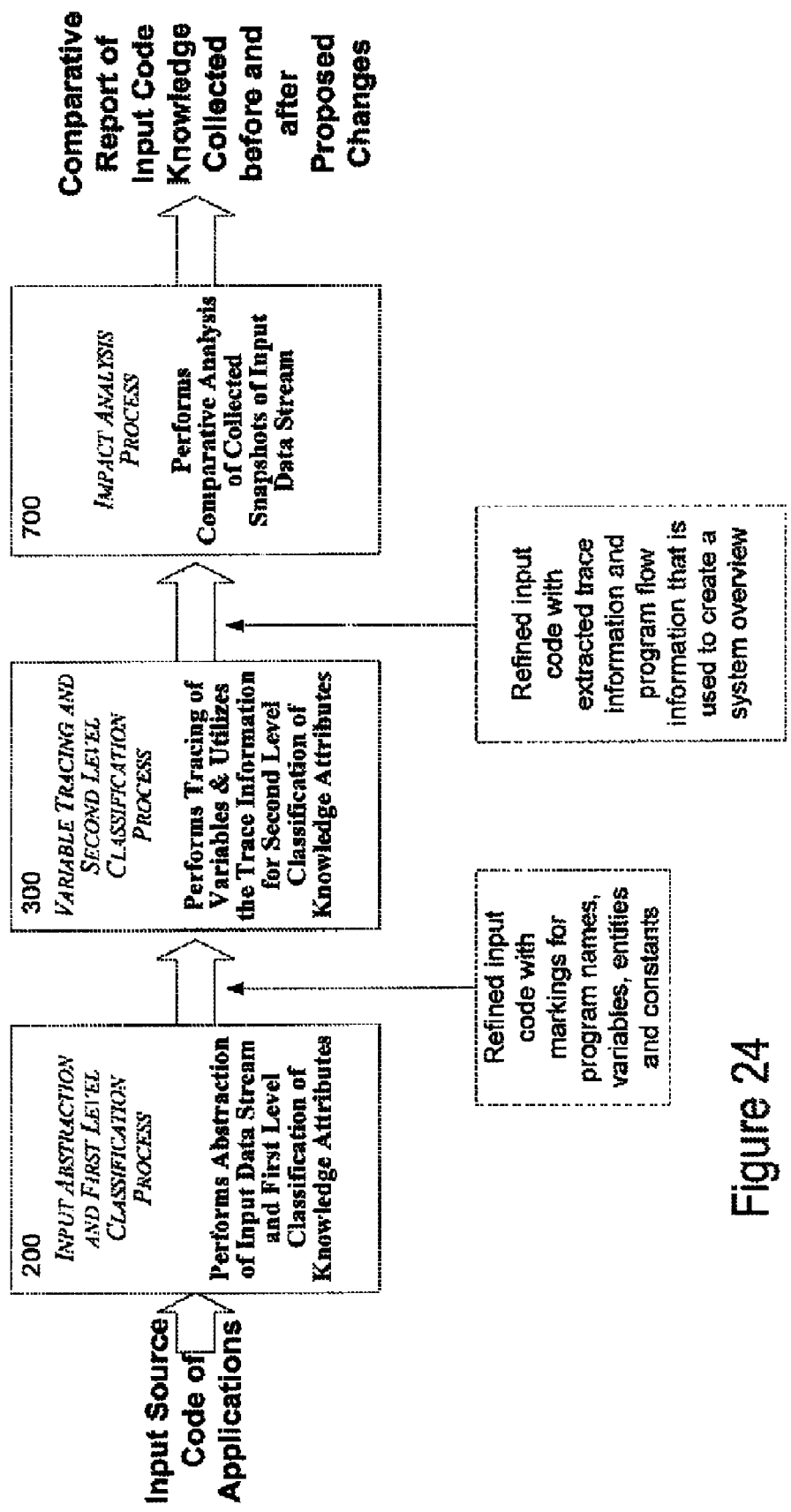
FIG. 24 is a flow diagram illustrating one embodiment of a process to conduct impact analysis.

FIG. 24 is a flow chart illustrating a process for the computing system 100 to conduct impact analysis to the modifications made to the software application. Similar to the flow chart described above with regard to FIG. 22, the computing system 100 accepts the source code of the software application without the modifications as input data stream and processes it using the process 200 and the process 300 and outputs refined input code with extracted trace information and program flow information that is used to create a system overview (e.g., refined input code without modifications). Similarly, the computing system 100 can also use the processes 200 and 300 to output refined input code for the source code with the modifications. The refined input codes with and without modifications can be provided as input to the impact analysis process 700, which is described above in detail with reference to FIG. 7. The process 700 outputs comparative report of input code knowledge collected before and after proposed changes.

Figure 25:
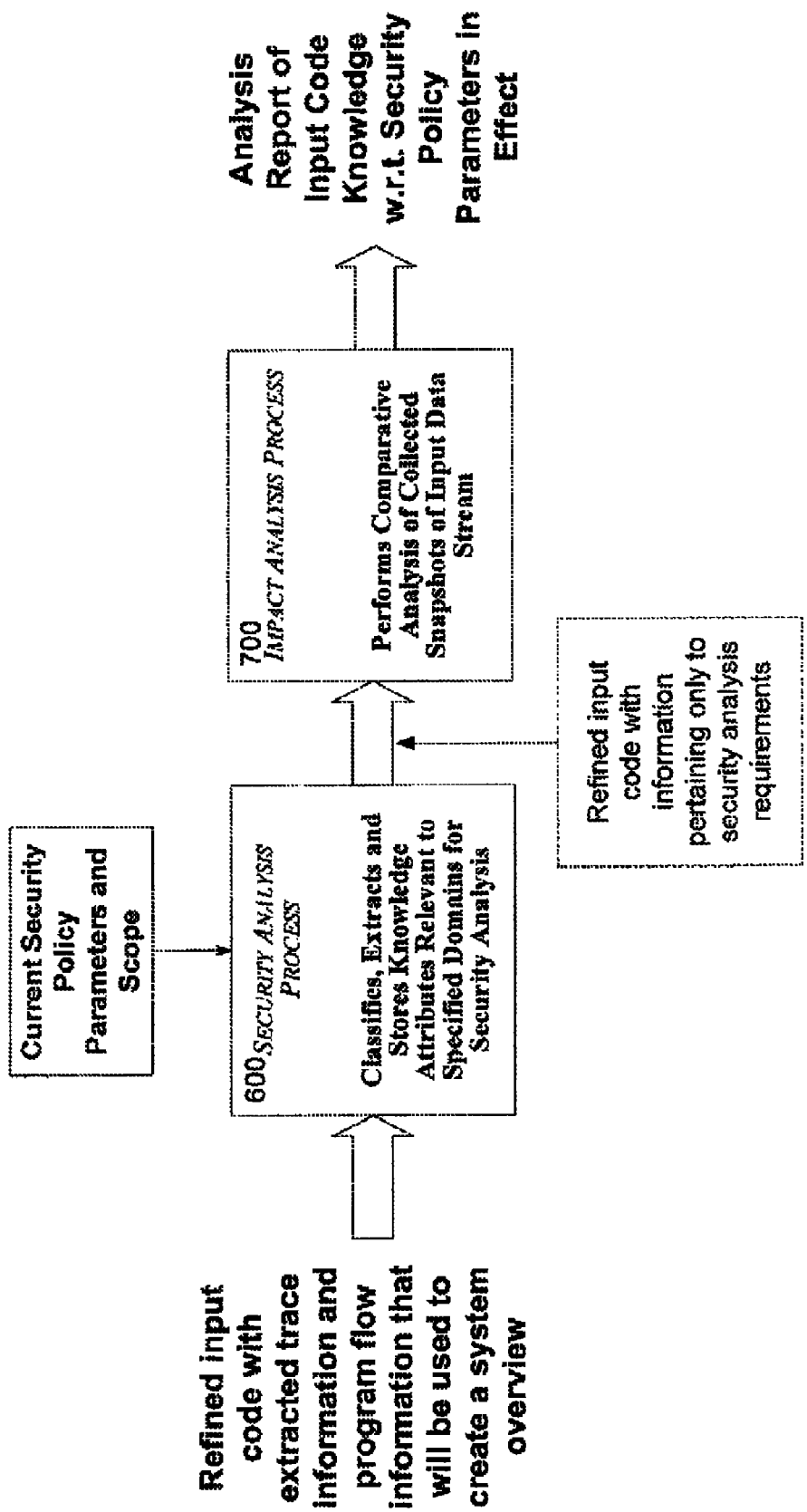
FIG. 25 is a flow diagram illustrating one embodiment of a process to conduct security analysis.

FIG. 25 is a flow chart illustrating a process for the computing system 100 to conduct security analysis to the modifications made to the software application. Similar to the flow chart described above with regard to FIG. 24, the computing system 100 can use the processes 200 and 300 to output refined input codes with and without modifications. The refined input codes with and without modifications can each individually be provided as input to the security analysis process 600, which is described above in detail with reference to FIG. 6. The process 600 also receives current security policy parameters and scope by way of user defined rules. The process 600 outputs refined input code with information pertaining only to security analysis requirements for the source codes with and without the modifications. The outputs of the process 600 can then be provided as input to the process 700, which outputs analysis report of input code knowledge with regard to security policy parameters in effect.

Figure 26:
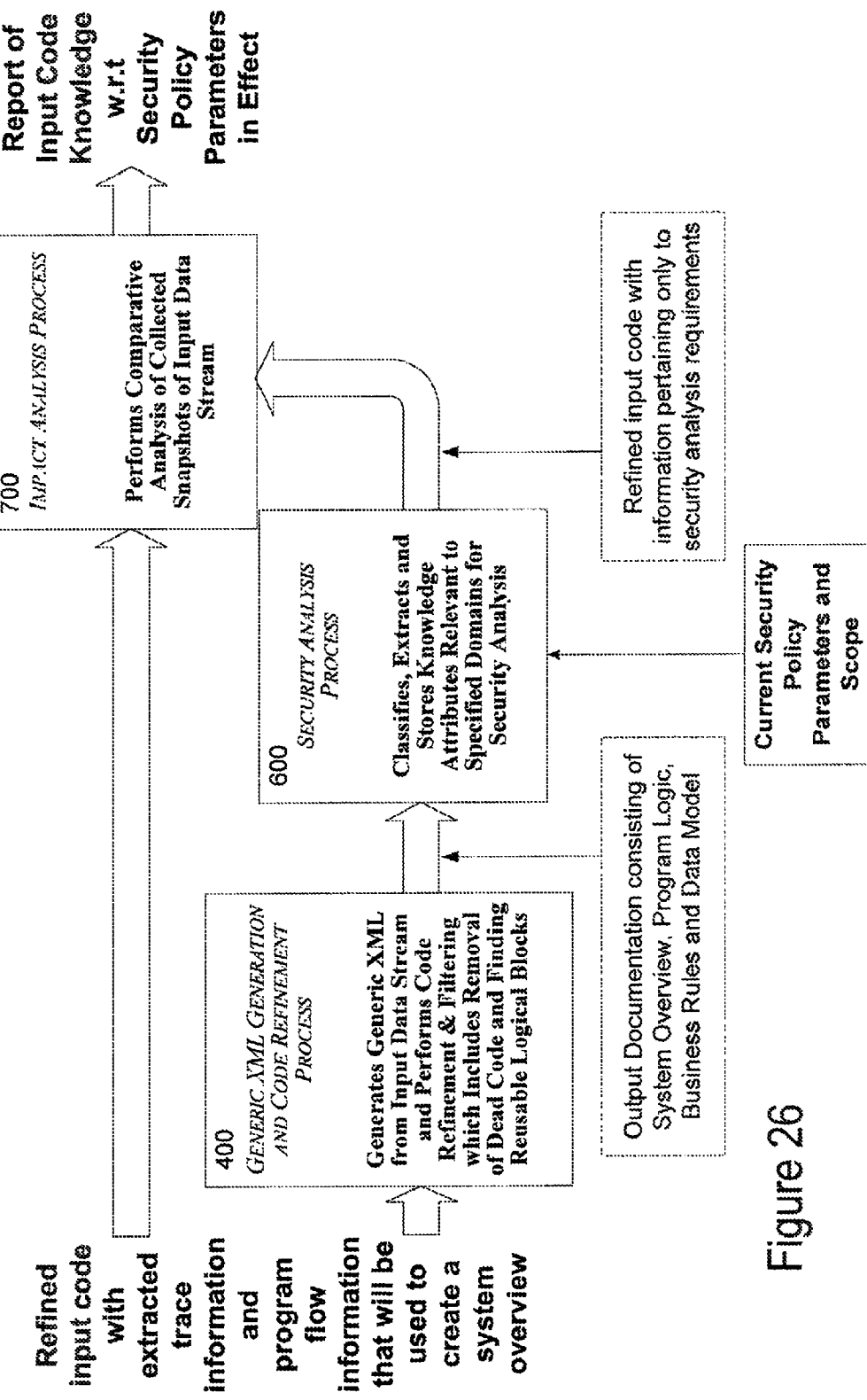
FIG. 26 is a flow diagram illustrating one embodiment of a process to conduct security with code audit analysis.

FIG. 26 is a flow chart illustrating a process for the computing system 100 to conduct security with code audit analysis to the modifications made to the software application. Similar to the flow chart described above with regard to FIG. 24, the computing system 100 can use the processes 200 and 300 to output refined input codes with and without the modifications. The refined input codes with and without the modifications can each individually be provided as input to the process 400, which outputs documentations for the source code with and without the modifications. The documentations for the source code with and without the modifications can each individually be provided as input to the process 600, which also receives current security policy parameters and scope and outputs refined input code with information pertaining only to security analysis requirements for the source codes with and without the modifications. The outputs of the process 600 and the outputs of the process 300 can be provided as inputs to the process 700, which outputs analysis report of input code knowledge with regard to security policy parameters in effect. During this process the input data streams before and after modifications are stored and compared using user defined rules that specify the parameters to be compared and changes (or modifications) to be allowed. A comparison report is generated with date and time information, thereby creating an audit trail that lists the parameters in the modifications that do not satisfy allowable requirements or standards.

Additional Information

The disclosed system and method is configured for learning business knowledge from a collection of source code. The collection of source code is abstracted to generate an abstracted data stream, which is then transformed to a XML format. The transformed data in XML format can be further converted to target formats or processed to satisfy different needs.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for abstracting embedded knowledge from a collection of data through the disclosed principles herein. Thus, while particular embodiments and applications have been illustrated and described, it is to be understood that the disclosure is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for extracting and abstracting knowledge embedded in source code of an application, the method comprising:
receiving the source code in a programming language;
extracting a plurality of knowledge elements from the source code based on predefined patterns;
responsive to no predefined pattern matching a part of the source code, creating a dynamic pattern using fuzzy-neural rules and dynamic rules and determining whether to store the dynamic pattern in a store;

determining knowledge attributes for the extracted knowledge elements by extracting keywords and descriptions from the source code;

classifying each of the extracted knowledge elements into one of a data entity, a variable, and a business rule, using classification patterns and associated knowledge attributes, wherein each of the classification patterns comprises a predefined pattern or a dynamic pattern;

generating an abstract representation of the source code in a standard format independent of the programming language of the source code, wherein the abstract representation includes the plurality of knowledge elements; and identifying the plurality of knowledge elements with associated knowledge attributes in the abstract representation.

2. The method of claim 1, further comprising:
standardizing the source code by removing unreadable characters from the source code.

3. The method of claim 1, further comprising:
verifying the identifying of the knowledge attributes in the abstract representation.

4. The method of claim 1, wherein determining the knowledge attributes comprises identifying a block in the source code using a first pattern matching at least a part of the source code, and wherein identifying the plurality of knowledge elements with the associated knowledge attributes comprises identifying the block in the abstract representation.

5. The method of claim 1, further comprising:
subdividing one of the plurality of knowledge elements using a second pattern matching at least a part of the abstract representation;
identifying the subdivided knowledge element with context information in the abstract representation; and
classifying the subdivided knowledge element in the abstract representation as a business rule using the context information and a third pattern.

6. The method of claim 5, further comprising:
presenting knowledge in the abstract representation in one of a plurality of formats, comprising: text, XML, graphic, one or more program language or pseudo program language.

7. The method of claim 5, wherein the third pattern comprises a predefined pattern or a dynamic pattern.

8. The method of claim 1, wherein the abstract representation is an output data stream in a XML format.

9. The method of claim 8, wherein the output data stream in the XML format is displayable as at least one of a graphic flow diagram, pseudo code, and text.

10. A system for extracting and abstracting knowledge embedded in an input data stream, comprising:
a processor;
a non-transitory computer readable storage medium;
a contextual taxonomy store segment configured to store patterns;
a pattern abstraction engine configured to receive the source code in a programming language;
a pattern hatcher engine configured to create a dynamic pattern using fuzzy-neural rules and dynamic rules when no predefined pattern match a part of the source code;
a pattern filtering engine configured to determine whether to store the dynamic pattern in the contextual taxonomy store segment;
a pattern conversion engine configured to extract a plurality of knowledge elements from the source code based on predefined patterns and to identify the plurality of knowledge elements in an abstract representation;

a contextual pattern decoder engine configured to determine knowledge attributes for the extracted knowledge elements by extracting keywords and descriptions from the source code, and to identify the knowledge attributes associated with the plurality of knowledge elements in the abstract representation; and a pattern classification engine configured to classify each of the extracted knowledge elements into one of a data entity, a variable, and a business rule, using classification patterns and associated knowledge attributes, wherein each of the classification patterns comprises a predefined pattern or a dynamic pattern, wherein the pattern abstraction engine is further configured to generate the abstract representation of the source code in a standard format independent of the programming language of the source code, and wherein the abstract representation includes the plurality of knowledge elements.

11. The system of claim 10, wherein the pattern abstraction engine is further configured to standardize the source code by removing unreadable characters from the source code.

12. The system of claim 10, wherein the contextual pattern decoder engine is further configured to verify the identifying of the knowledge attributes in the abstract representation.

13. The system of claim 10, wherein the pattern classification engine is further configured to identify a block in the source code using a first pattern matching at least a part of the source code, and to identify the block in the abstract representation.

14. The system of claim 10, wherein the contextual pattern decoder engine is further configured to subdivide one of the plurality of knowledge elements using a second pattern matching at least a part of the abstract representation, to identify the subdivided knowledge element with context information in the abstract representation, and
wherein the pattern classification engine is further configured to classify the subdivided knowledge element in the abstract representation as a business rule using the context information and a third pattern.

15. The system of claim 14, wherein knowledge in the abstract representation can be presented in one of a plurality of formats, comprising: text, XML, graphic, one or more program language or pseudo program language.

16. The system of claim 14, wherein the third pattern comprises a predefined pattern or a dynamic pattern.

17. The system of claim 10, wherein the abstract representation is an output data stream in a XML format.

18. The system of claim 17, wherein the output data stream in the XML format is displayable as at least one of a graphic flow diagram, pseudo code, and text.

19. A non-transitory computer readable storage medium structured to store instructions executable by the processor to extract and abstract knowledge embedded in source code of an application the instructions when executed by the processor cause the processor to:
receive the source code in a programming language;
extract a plurality of knowledge elements from the source code based on predefined patterns
responsive to no predefined pattern matching a part of the source code, creating a dynamic pattern using fuzzy-neural rules and dynamic rules and determine whether to store the dynamic pattern in a store;
determine knowledge attributes for the extracted knowledge elements by extracting keywords and descriptions from the source code
classify each of the extracted knowledge elements into one of a data entity, a variable, and a business rule, using classification patterns and associated knowledge attributes, wherein each of the classification patterns comprises a predefined pattern or a dynamic pattern;

generate an abstract representation of the source code in a standard format independent of the programming language of the source code, wherein the abstract representation includes the plurality of knowledge elements; and identify the plurality of knowledge elements with associated knowledge attributes in the abstract representation.

20. The non-transitory computer readable storage medium of claim 19, wherein the instructions when executed by the processor further cause the processor to:

standardize the source code by removing unreadable characters from the source code.

21. The non-transitory computer readable storage medium of claim 19, wherein the instructions when executed by the processor further cause the processor to:

verify the identifying of the knowledge attributes in the abstract representation.

22. The non-transitory computer readable storage medium of claim 19, wherein determine the knowledge attributes comprises identify a block in the source code using a first pattern matching at least a part of the source code, and wherein identify the plurality of knowledge elements with the associated knowledge attributes comprises identify the block in the abstract representation.

23. The non-transitory computer readable storage medium of claim 19, wherein the instructions when executed by the processor further cause the processor to:

subdivide one of the plurality of knowledge elements using a second pattern matching at least a part of the abstract representation;

identify the subdivided knowledge element with context information in the abstract representation; and classify the subdivided knowledge element in the abstract representation as a business rule using the context information and a third pattern.

24. The non-transitory computer readable storage medium of claim 23, wherein the instructions when executed by the processor further cause the processor to:

present knowledge in the abstract representation in one of a plurality of formats, comprising: text, XML, graphic, one or more program language or pseudo program language.

25. The non-transitory computer readable storage medium of claim 23, wherein the third pattern comprises a predefined pattern or a dynamic pattern.

26. The non-transitory computer readable storage medium of claim 19, wherein the abstract representation is an output data stream in a XML format.

27. The non-transitory computer readable storage medium of claim 26, wherein the output data stream in the XML format is displayable as at least one of a graphic flow diagram, pseudo code, and text.

* * * * *